(12) United States Patent
Kim et al.

(10) Patent No.: US 11,704,396 B2
(45) Date of Patent: Jul. 18, 2023

(54) VEHICLE ELECTRONIC DEVICE FOR PERFORMING AUTHENTICATION, MOBILE DEVICE USED FOR VEHICLE AUTHENTICATION, VEHICLE AUTHENTICATION SYSTEM, AND VEHICLE AUTHENTICATION METHOD

(71) Applicant: Samsung Electronics Co., Ltd., Gyeonggi-do (KR)

(72) Inventors: Youngil Kim, Gyeonggi-do (KR); Junhong Kim, Gyeonggi-do (KR); Eunkyung Hwangbo, Gyeonggi-do (KR); Hyunsik Ki, Gyeonggi-do (KR); Sanghoon Lee, Gyeonggi-do (KR); Honghoon Jang, Gyeonggi-do (KR); Hyeonhun Jung, Gyeonggi-do (KR); Youngsuk Jo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 17/016,519

(22) Filed: Sep. 10, 2020

(65) Prior Publication Data

US 2021/0073367 A1      Mar. 11, 2021

(30) Foreign Application Priority Data

Sep. 11, 2019  (KR) ........................ 10-2019-0113018

(51) Int. Cl.
*H04L 29/06*      (2006.01)
*G06F 21/32*      (2013.01)
(Continued)

(52) U.S. Cl.
CPC .............. *G06F 21/32* (2013.01); *G06F 21/35* (2013.01); *G07C 9/26* (2020.01); *H04W 4/80* (2018.02); *G06F 2221/2117* (2013.01)

(58) Field of Classification Search
CPC .. G06F 21/32; G06F 21/35; G06F 2221/2117; G07C 9/26; H04W 4/80
(Continued)

(56) References Cited

U.S. PATENT DOCUMENTS 8,583,317 B2   11/2013   Nishida
9,268,545 B2    2/2016   Lortz et al.
(Continued)

FOREIGN PATENT DOCUMENTS

DE    102017122346 A1   3/2018
EP       2860071 A1     9/2014
(Continued)

OTHER PUBLICATIONS

European Search Report dated Feb. 10, 2021.
(Continued)

*Primary Examiner* — Evans Desrosiers
(74) *Attorney, Agent, or Firm* — Cha & Reiter, LLC

(57) ABSTRACT

According to certain embodiments, a vehicle electronic device comprises a transceiver configured to communicate with a mobile device; and at least one processor configured to generate first authentication information, control the transceiver to transmit the first authentication information to a registered mobile device, control the transceiver to send a request for authentication to the mobile device via a first communication connection, and perform authentication based on whether or not the processor receives second authentication information from the mobile device that corresponds to the first authentication information, wherein the first communication connection directly communicates with the mobile device.

12 Claims, 24 Drawing Sheets

(51) Int. Cl.
*H04W 4/80* (2018.01)
*G07C 9/26* (2020.01)
*G06F 21/35* (2013.01)

(58) Field of Classification Search
USPC .......................................................... 713/186
See application file for complete search history.

(56) References Cited

U.S. PATENT DOCUMENTS

| | | |
|---|---|---|
| 9,875,589 B1 | 1/2018 | Buttolo et al. |
| 10,384,647 B2 | 8/2019 | Tayama |
| 10,569,740 B2 | 2/2020 | Lee |
| 2005/0273505 A1* | 12/2005 | Kim ........................ H04L 67/12 |
| | | 709/220 |
| 2012/0095642 A1 | 4/2012 | Nishida |
| 2015/0217726 A1 | 8/2015 | Lee et al. |
| 2016/0147990 A1 | 5/2016 | Schneider |
| 2017/0001598 A1 | 1/2017 | Pophale et al. |
| 2018/0109947 A1 | 4/2018 | Kim et al. |
| 2018/0162321 A1* | 6/2018 | Spiess ................. G07C 9/00309 |
| 2018/0215347 A1* | 8/2018 | Weghaus .............. B60R 25/245 |
| 2018/0232971 A1 | 8/2018 | Schieke et al. |
| 2019/0054899 A1 | 2/2019 | Hoyos et al. |
| 2019/0080540 A1 | 3/2019 | Sim |
| 2019/0135229 A1 | 5/2019 | Ledvina et al. |
| 2019/0217816 A1 | 7/2019 | Lee |
| 2020/0082654 A1* | 3/2020 | Lee .................... G07C 9/00309 |
| 2021/0073363 A1* | 3/2021 | Talha ...................... B60R 25/24 |

FOREIGN PATENT DOCUMENTS

| | | |
|---|---|---|
| JP | 5120437 | 11/2012 |
| JP | 2017-43267 A | 3/2017 |
| KR | 10-2015-0089697 A | 8/2015 |
| KR | 10-1893224 B1 | 8/2018 |
| KR | 10-2019-0029920 A | 3/2019 |
| KR | 10-2019-0086352 A | 7/2019 |
| WO | 2012/134571 A1 | 10/2012 |

OTHER PUBLICATIONS

Office Action dated Jul. 19, 2022.
International Search Report dated Dec. 3, 2020.
EP Notice of Allowance dated Jan. 2, 2023.

* cited by examiner

VEHICLE ELECTRONIC DEVICE FOR PERFORMING AUTHENTICATION, MOBILE DEVICE USED FOR VEHICLE AUTHENTICATION, VEHICLE AUTHENTICATION SYSTEM, AND VEHICLE AUTHENTICATION METHOD

CROSS-REFERENCE TO RELATED APPLICATION

This application is based on and claims priority under 35 U.S.C. § 119 to Korean Patent Application No. 10-2019-0113018, filed on Sep. 11, 2019, in the Korean Intellectual Property Office, the disclosure of which is incorporated by reference herein in its entirety.

BACKGROUND

1. Field

The disclosure relates to a vehicle electronic device for performing authentication, a mobile device used for vehicle authentication, a server used for vehicle authentication, a vehicle authentication system, and a vehicle authentication method.

More particularly, the disclosure relates to a vehicle electronic device, a mobile device, a vehicle authentication system, and a vehicle authentication method, which are configured to perform authentication when authority for controlling, setting, and/or using a vehicle is to be authenticated.

2. Description of Related Art

There are a number of functions that have been developed to provide convenience to a user operating a vehicle.

For example, there are authentication functions related to a vehicle. When a user attempts to operate a vehicle, the vehicle may communicate with a server, or the like to authenticate whether the user has the authority to operate the vehicle (e.g., is either the owner, member of the owner's household, or authorized by the owner). Also, in order to authenticate whether or not the user has authority, the vehicle may perform biometric authentication with respect to the user.

A vehicle typically is an expensive item. As a result, it can be a target for theft. Moreover, due to its ability to move at high speeds, it becomes important to prevent unauthorized person, as immediate recovery can be difficult.

SUMMARY

According to certain embodiments, a vehicle electronic device comprises a transceiver configured to communicate with a mobile device; and at least one processor configured to generate first authentication information, control the transceiver to transmit the first authentication information to a registered mobile device, control the transceiver to send a request for authentication to the mobile device via a first communication connection, and perform authentication based on whether or not the processor receives second authentication information from the mobile device that corresponds to the first authentication information, wherein the first communication connection directly communicates with the mobile device.

According to certain embodiments, a mobile device comprises a user interface; a display; a transceiver; and at least one processor configured to: receive and store first authentication information generated by a registered vehicle electronic device, in response to a request of authentication being received directly from the vehicle electronic device through a first communication connection through the transceiver, generate second authentication information corresponding to the first authentication information, and control the transceiver to transmit the second authentication information to the vehicle electronic device through the first communication connection.

According to certain embodiments, a system for performing authentication with respect to a vehicle, comprises a mobile device and a vehicle electronic device located in the vehicle, wherein the mobile device is configured to receive and store first authentication information generated by a registered vehicle electronic device, in response to a request of authentication being received from the vehicle electronic device through a first communication connection directly communicating with the vehicle electronic device, generate second authentication information corresponding to the first authentication information, and transmit the second authentication information to the vehicle electronic device through the first communication connection, and the vehicle electronic device is configured to generate the first authentication information, control the first authentication information to be transmitted to a registered mobile device, send a request for authentication to the mobile device via the first communication connection, and perform the authentication based on whether or not the vehicle electronic device receives second authentication information transmitted from the mobile device that corresponds to the first authentication information.

According to certain embodiments, a vehicle authentication method comprises generating, by a vehicle electronic device, first authentication information; transmitting, by the vehicle electronic device, the first authentication to a registered mobile device; receiving and storing, by the mobile device, the first authentication information; requesting, by the vehicle electronic device, authentication through the mobile device via a first communication connection for the vehicle electronic device and the mobile device to directly communicate with each other; generating, by the mobile device, second authentication information based on the first authentication information, in response to the request of the authentication; transmitting, by the mobile device, the second authentication information to the vehicle electronic device; and performing, by the vehicle electronic device, the authentication based on whether or not the received second authentication information corresponds to the first authentication information.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
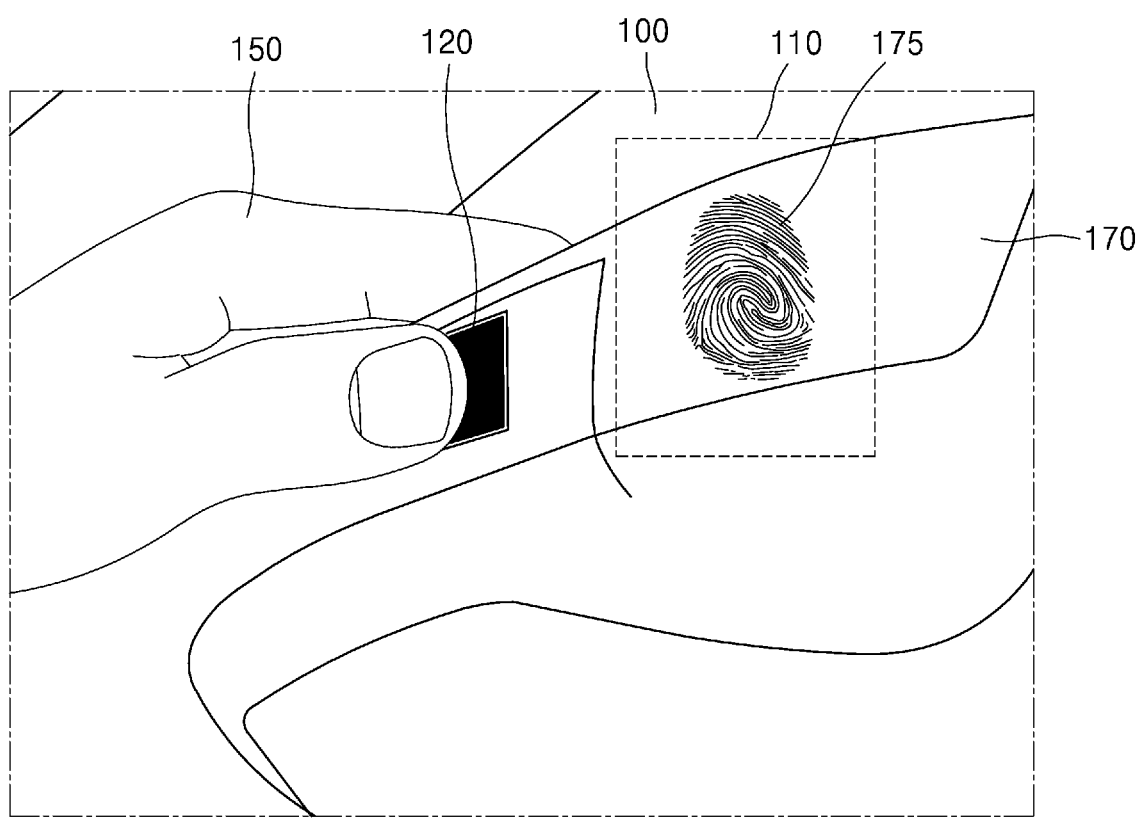
FIG. 1 is a view for describing authentication of a vehicle.

Hereinafter, embodiments of the disclosure will be described in detail with reference to the accompanying drawings so that one of ordinary skill in the art could easily execute the disclosure. However, the disclosure may have different forms and should not be construed as being limited to the embodiments of the disclosure described herein. Also, in the drawings, parts not related to descriptions are omitted for the clear description of the disclosure, and throughout the specification, like reference numerals are used for like elements.

Throughout the specification, when a part is referred to as being "connected" to other parts, the part may be "directly connected" to the other parts or may be "electrically connected" to the other parts with other devices therebetween. When a part "includes" a certain element, unless it is specifically mentioned otherwise, the part may further include another component and may not exclude the other component.

The expressions such as "in some embodiments of the disclosure," "according to an embodiment of the disclosure," and the like, described in various parts of this specification do not necessarily refer to the same element as one another.

One or more embodiments of the disclosure may be described as functional block components and various processing operations. All or part of such functional blocks may be realized by any number of hardware and/or software components configured to perform the specified functions. For example, the functional blocks of the disclosure may be implemented with one or more micro-processors or with circuit structures for certain functions. Also, for example, the functional blocks of the disclosure may be implemented with various programming or scripting languages. The functional blocks may be implemented with algorithms executed by one or more processors. Furthermore, the disclosure could employ conventional techniques for electronics configuration, signal processing and/or data control. The words "module," "element," "configuration," etc. may be broadly used and are not limited to mechanical or physical components.

Furthermore, the connecting lines, or connectors shown in the drawings are intended to represent example functional relationships and/or physical or logical couplings between the various elements. It should be noted that many alternative or additional functional relationships, physical connections or logical connections may be present in a practical device.

Throughout the disclosure, the expression "at least one of a, b or c" indicates only a, only b, only c, both a and b, both a and c, both b and c, all of a, b, and c, or variations thereof.

According to embodiments of the disclosure, a vehicle electronic device, a mobile device, a vehicle authentication system, and a vehicle authentication method, which are configured to perform authentication with respect to a vehicle, may perform the authentication with respect to the vehicle without requiring an additional hardware device (for example, a sensor for fingerprint recognition, a sensor for iris recognition, other devices, etc.) provided in the vehicle or the vehicle electronic device for authentication using biometric information.

Hereinafter, the vehicle electronic device, the mobile device, the vehicle authentication system, and the vehicle authentication method according to embodiments of the disclosure will be described in detail with reference to the accompanying drawings. In the accompanying drawings, like elements are referred to by using like reference numbers. Also, throughout the detailed description, like elements are referred to by using like terms.

Mechanical keys can be used to prevent unauthorized persons from operating a vehicle. For example, a switch which can only be moved can be used to fasten the doors of the vehicle, and interrupt the ignition. However, due to it mechanical nature, the switch over time can degrade. Moreover, copies of the key can be made by many locksmiths, thus comprising security.

A smart key is used as a vehicle key to open a door and start up a vehicle. A smart key is a device configured to automatically open or close a door and start up a vehicle via wireless functions. The smart key may control the vehicle to perform its functions. Here, a user may be an owner of the vehicle or a person having legitimate authority to use the vehicle. For example, when the user approaches the vehicle and presses a button coupled to a door knob of the vehicle, the door of the vehicle is switched from a lock state to an unlock state.

Also, in the case of a vehicle manipulated by a smart key, when the smart key is located in the vehicle, the smart key may control operations for starting up the vehicle.

As described above, in the case of the vehicle for which the smart key is used to manipulate operations and functions, a user needs to have the smart key with him/her to execute the function of opening a door of the vehicle. When the user does not have the smart key with him/her, the user may be unable to unlock the door of the vehicle. This can be problem if the user loses the smart key. Moreover, it is harder to replace or make duplicates of the smart key, thus exacerbating the problem.

Thus, to allow a user to control, set, and/or use functions or operations of a vehicle even when the user does not have a smart key, technologies have been developed for performing authentication with respect to operations of a vehicle from within or outside the vehicle.

Hereinafter, a vehicle capable of performing authentication by using biometric authentication technologies will be described by referring to FIGS. 1 and 2. Hereinafter, in FIGS. 1 and 2, examples of using fingerprint authentication as examples of biometric authentication will be described.

FIG. 1 is a view for describing vehicle authentication.

FIG. 1 illustrates a vehicle 100 including a sensor 120 for biometric authentication coupled to a handle 170 of a door. A user 150 may grab the handle 170 so that a finger of the user 150 may contact the sensor 120. In this case, the sensor 120 may detect a fingerprint 175 of the user 150. Also, the vehicle 100 may determine whether or not the detected fingerprint matches with a fingerprint of a registered user. When the detected fingerprint matches with the fingerprint of the registered user, the vehicle 100 may open the door.

FIG. 1 illustrates a shape of the fingerprint 175 which is recognized by the sensor 120 in a separate block 110, for convenience of explanation.

There is, however, a cost for coupling a hardware device (e.g., the sensor 120, etc.) for the recognition of biometric information to the outside of the vehicle 100. Also, a software program for authenticating biometric information is needed. For vehicles without sensor 120, authentication based on biometric information cannot be performed.

Additionally, the sensor 120 is coupled to the outside of the vehicle 100, and thus, susceptible to contamination and degradation from external factors such as dust, snow, rain, sleet, and wind, etc. As a result of the degradation, the sensor 120 may fail to authenticate a fingerprint of an authorized user.

Figure 2:
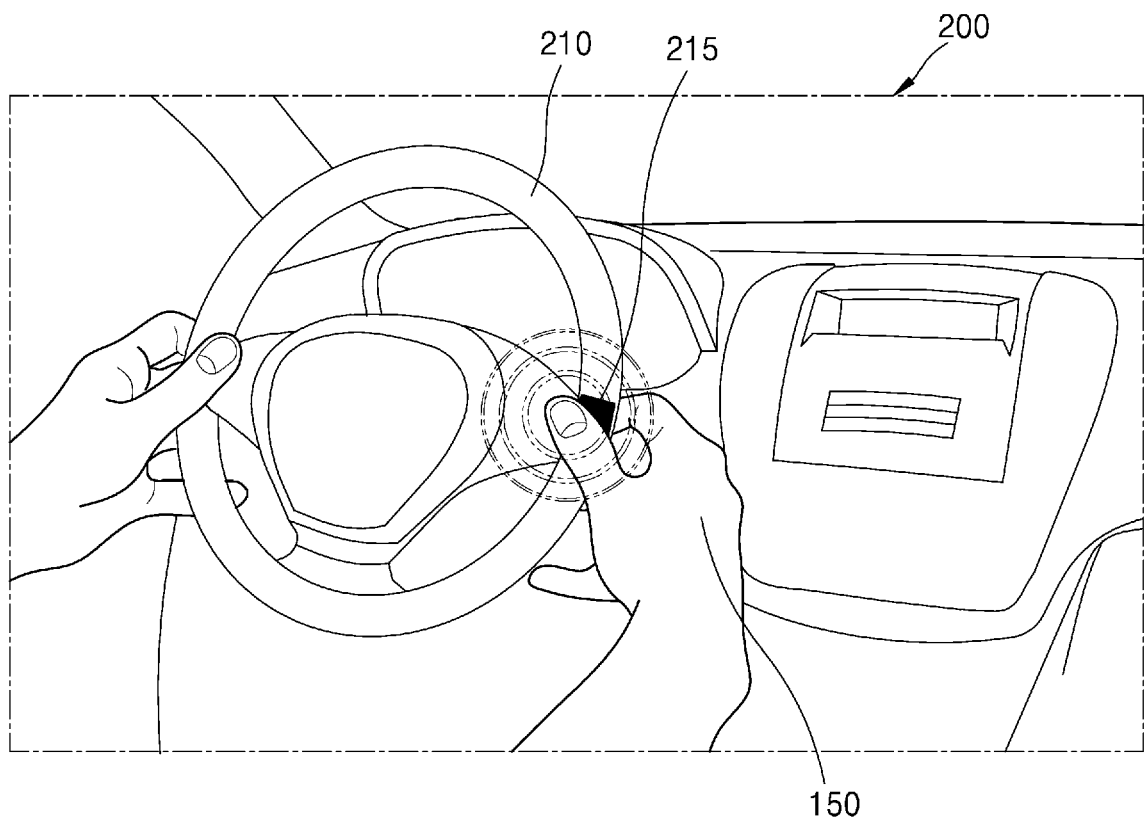
FIG. 2 is another view for describing authentication of a vehicle.

FIG. 2 is another view for describing vehicle authentication.

FIG. 2 illustrates a case in which a hardware device (for example, a sensor 215) for biometric recognition is mounted within a vehicle 200. Specifically, the sensor 215 for recognizing a fingerprint may be coupled to a steering wheel 210 of the vehicle 200. In this case, the user 150 may have his/her fingerprint recognized by sensor 215 by touching a finger to the sensor 215. The sensor 215 can corresponds to the sensor 120 of FIG. 1.

As illustrated in FIG. 2, when a hardware device (e.g., the sensor 215) for biometric recognition is arranged in the vehicle 200, there is still the issue of added cost. That is, when the hardware device (e.g., the sensor 215, etc.) for recognizing biometric information is arranged in the vehicle 200, there are costs for mounting the hardware device such as the sensor 215.

However, if mobile device has a biometric sensor, it may be possible to use the sensor of the mobile device to authenticate the user without incurring the costs of mounting the sensor in the vehicle.

Provided are a vehicle electronic device, a mobile device used for vehicle authentication, a vehicle authentication system, and a vehicle authentication method, which are configured to perform authentication with respect to a vehicle without adding an additional hardware device.

Also, provided are a vehicle electronic device, a mobile device used for vehicle authentication, a vehicle authentication system, and a vehicle authentication method, which are configured to quickly perform authentication by using a communication connection for directly connecting devices.

Also, provided are a vehicle electronic device, a mobile device used for vehicle authentication, a vehicle authentication system, and a vehicle authentication method, which are configured to perform authentication without a need to access a server through a long distance communication connection, such as the Internet, etc., whenever the authentication is performed.

Additional aspects will be set forth in part in the description which follows and, in part, will be apparent from the description, or may be learned by practice of the presented embodiments of the disclosure.

Hereinafter, operations performed by a vehicle electronic device and a mobile device will be described in detail by referring to FIG. 3.

Figure 3:
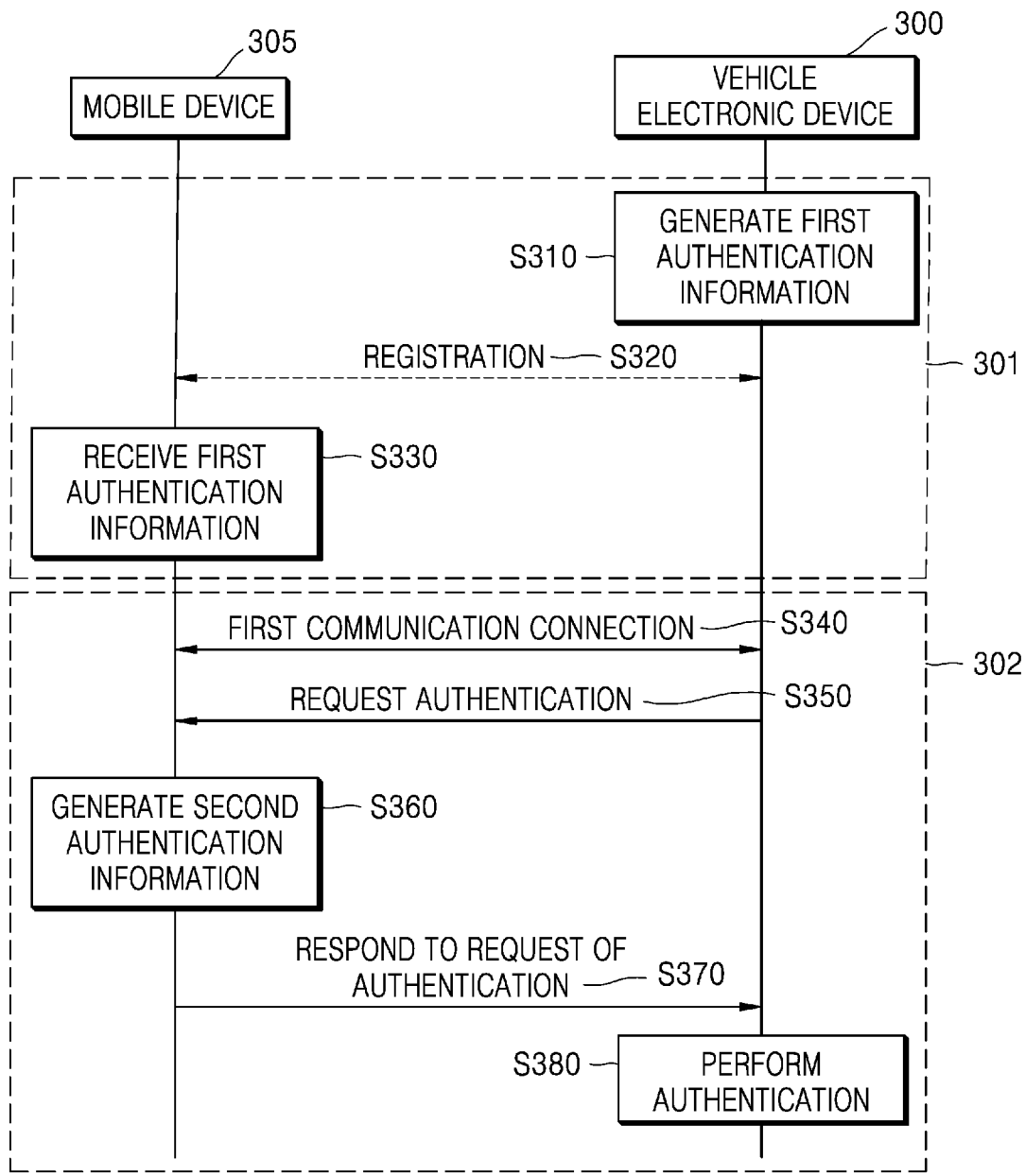
FIG. 3 is a diagram for describing a mobile device and a vehicle electronic device for performing authentication with respect to a vehicle, according to an embodiment of the disclosure.

FIG. 3 is a diagram for describing a mobile device and a vehicle electronic device for performing authentication with respect to a vehicle, according to an embodiment of the disclosure.

According to an embodiment of the disclosure, the vehicle electronic device may refer to a device configured to perform authentication with respect to services, functions, and/or operations performed in a vehicle and may be included or arranged in the vehicle.

In detail, the vehicle electronic device may include an electronic device for realizing the in-vehicle infotainment (IVI) technology. Hereinafter, the in-vehicle infotainment will be abbreviated to "IVI."

An IVI system refers to a system configured to display various information which may be provided by a vehicle, such as radio, navigation, voice commands, automatic safety diagnosis, etc., so that a user (a driver and/or a companion) may easily and conveniently recognize and use the information. Also, the term infotainment is a combined term of information and entertainment, thereby indicating both information and entertainment. That is, an IVI system may denote a system configured to allow easy and convenient use of information as entertainment.

The IVI system may be a system configured to increase the enjoyment and the convenience of a user of a vehicle. Thus, the IVI system is developed and advanced in pursuit of a further increase in the convenience of a user.

In one embodiment, a vehicle electronic device 300 authentication operation can be conditioned on proximity to and/or access of a specific mobile device 305. Generally, a mobile device 305 is closely associated with a person, and generally located in close proximity to the person. When a user attempts to operate a vehicle (which is not limited to driving, but can include, depending on embodiment, accessing any of features of the vehicle) associated with a vehicle electronic device, the vehicle electronic device 300 generates and transmits first authentication to the mobile device 305 over, for example, a device-to-device connection. The authentication information can be, for example, the vehicle identification number. The mobile device 305 can perform an operation, such as open key, and individual key, a symmetric key, an asymmetric key, or hashing, among others, on the first authentication information, thereby generating second authentication information. The vehicle electronic device 305 can authenticate based on the second authentication information. For example, the vehicle electronic device 300 can perform that same operation on the first authentication information and determine whether the second authentication information received from the mobile device matches.

Referring to FIG. 3, a vehicle electronic device 300 according to an embodiment of the disclosure may include an electronic device realizing an IVI system. In detail, the vehicle electronic device 300 according to the embodiment of the disclosure may perform authentication with respect to a vehicle rapidly and conveniently, without a user performing biometric authentication by using a hardware device included in the vehicle. Also, the vehicle electronic device 300 according to the embodiment of the disclosure may include an electronic device, which is included or located in a vehicle and configured to perform authentication, and may be realized in various forms, in addition to an electronic device realizing an IVI system.

Referring to FIG. 3, a mobile device 305 according to an embodiment of the disclosure may refer to a portable electronic device for performing authentication with respect to a vehicle by communicating with the vehicle. In detail, the mobile device 305 may include mobile computing devices, such as a wearable device, a smart phone, a tablet personal computer (PC), a personal digital assistant (PDA), a laptop computer, a media player, a micro server, a global positioning system (GPS) device, etc.

Also, according to an embodiment of the disclosure, the authentication may denote an operation of determining whether a user requesting authentication is a user having a legitimate authority or not. Alternatively, the authentication may denote an operation of identifying whether a request for operations of controlling, setting, using, service-executing, and/or others with respect to a vehicle is legitimate or not.

In detail, according to an embodiment of the disclosure, when operations described below are requested, the authentication according to an embodiment of the disclosure may be performed. With respect to a vehicle, the following operations may be requested: (i) opening a door of the vehicle; (ii) starting up the vehicle (such as ignition of an internal combustion engine); (iii) executing services (here, the services may include ones provided by the vehicle); (iv) executing applications performed in the vehicle; (v) setting an IVI system corresponding to a user; (vi) setting a driving environment (for example, a seat angle and height, a handle location, a rear mirror, and/or cooling and warming temperature-adjustment of the vehicle) of the vehicle according to a user; (vii) controlling the vehicle outside the vehicle (for example, a case in which a user located apart from the vehicle by a distance greater than or equal to a certain distance requests a controlling operation, such as starting up the vehicle or turning off the light of the vehicle, via a mobile device; and (viii) executing services according to the user (for example, when user A is on board in the vehicle, selecting and playing music and radio programs classified into the genre of ballad and when user B is on board in the vehicle, selecting and playing music and radio programs classified into the classical music. Also, the authentication may be performed, (ix) when it is sensed that a user is on board in the vehicle.

In certain embodiments, the vehicle electronic device 300 can be disposed to control the flow of electricity from a battery to an engine coil in an internal combustion engine, wherein authentication is require to permit the flow of electricity. In another embodiment, the vehicle electronic device 300 can be disposed between a power source and an engaged latch in a door. Upon authentication, the vehicle electronic device 300 permits power from the power source to disengage the latch in the door.

When the events described above are requested, the authentication according to an embodiment of the disclosure may be performed to determine whether the requests according to the events (i) through (ix) described above are legitimate or not. Also, according to a result of the authentication, the vehicle may accept the request and perform an operation corresponding to the request or reject the request and may not perform an operation corresponding to the request.

Referring to FIG. 3, according to an embodiment of the disclosure, the vehicle electronic device 300 may generate first authentication information to perform authentication (S310). Here, the first authentication information may include at least one of identification information about a vehicle or identification information about a user requesting authentication via the mobile device 305.

In detail, the first authentication information may include unique information indicating at least one of the vehicle or the user, the unique information being used for authentication with respect to the vehicle. Alternatively, the first authentication information may include identification information for identifying at least one of the vehicle (or the vehicle electronic device) or the user from at least one of another vehicle (or another vehicle electronic device) or another user. That is, the first authentication information may include information for specifying a vehicle (or a vehicle electronic device) and/or a user requesting the authentication, from among a plurality of vehicles (or a plurality of vehicle electronic devices and/or a plurality of users.

In detail, when a request, a prerequisite for the authentication, is related to an operation which may be performed by the vehicle without a need to identify the user, the first authentication information may include unique information with respect to the vehicle, which enables identification of the vehicle from other vehicles. Here, the vehicle to be identified may denote a vehicle in which the vehicle electronic device according to an embodiment of the disclosure is included or coupled.

For example, when the authentication is to be performed based on a request of starting up the vehicle, the request, which is the prerequisite for the authentication, does not require identification of the user. That is, just when the user requesting the authentication is a legitimate user of the vehicle, the vehicle may be controlled to be start up. In this case, the first authentication information may include the unique information about the vehicle or the identification information about the vehicle. For example, the first authentication information may denote information to specify a vehicle, which is a target of authentication, and may include information to identify the vehicle from other vehicles, such as a factory number of the vehicle, a Vehicle Identification Number (VIN), a registration number of the vehicle, a password which is set to identify the vehicle, etc.

As another example, when the request, which is the prerequisite for the authentication, requires identification of the user, that is, when the request is related to operations that are to be performed in the vehicle in different ways between separate users, the first authentication information may include the unique information about the vehicle and the user, which enables identification about the vehicle and the user. For example, a case in which the request, the prerequisite for the authentication, is a user-customized environment setting request will be described. In detail, the legitimate user of a vehicle may include user 1 and user 2, and user 1 and user 2 may require different driving seat settings (a location and a height of a driving seat and a location of a back mirror) from each other. In this case, authentication may need to be performed separately for user 1 and user 2, and thus, the first authentication information may include information for identifying each of user 1 and user 2 using the vehicle.

Also, the mobile device 305 and the vehicle electronic device 300 may be registered in pair (S320). Here, the registration may denote a process of completing a communication connection such that only two different electronic devices may communicate with each other. In detail, the registration operation may include pairing two electronic devices according to a certain communication standard.

Also, it is illustrated in FIG. 3 that the registration operation (S320) is performed after the operation of generating the first authentic information (S310). However, the registration operation (S320) between the mobile device 305 and the vehicle electronic device 300 may be performed before the operation of generating the first authentic information (S310). That is, the mobile device 305 and the vehicle electronic device 300 may be registered in pair and may recognize each other as registered devices, before the first authentication information is generated. When the registration operation (S320) is performed before operation S310, the vehicle electronic device 300 may generate the first authentication information and may right afterwards directly transmit the first authentication information to the mobile device 305 or transmit the first authentication information to the mobile device 305 through a transmission device (not shown), such as a server (not shown), etc. Accordingly, the mobile device 305 may receive the first authentication information. Hereinafter, for convenience of explanation, an example in which the transmission device configured to transmit data between the mobile device 305 and the vehicle electronic device 300 is a server (not shown) will be described and illustrated.

Hereinafter, an example in which the registration operation (S320) is performed after the operation of generating the first authentication information (S310) as illustrated in FIG. 3 will be described.

For example, in a case where the mobile device 305 and the vehicle electronic device 300 are connected via a communication network according to a Bluetooth communication standard, the mobile device 305 and the vehicle electronic device 300 may complete the registration operation by performing a pairing operation according to the Bluetooth communication standard and transceiving data required for a Bluetooth communication connection.

As another example, in a case where the mobile device 305 and the vehicle electronic device 300 are connected to each other via an Internet on things (IoT) platform, the mobile device 305 and the vehicle electronic device 300 may complete the registration operation, according to a communication network standard for forming the IoT platform.

As another example, in a case where the mobile device 305 and the vehicle electronic device 300 are connected via a Bluetooth low energy (BLE) communication network, the mobile device 305 and the vehicle electronic device 300 may complete the registration operation by performing a pairing operation according to a BLE communication standard and transceiving data required for a BLE communication connection.

Also, the mobile device 305 may be a main agent and the vehicle electronic device 300 may be registered in the mobile device 305. Also, the vehicle electronic device 300 may be a main agent and the mobile device 305 may be registered in the vehicle electronic device 300.

For example, the vehicle electronic device 300 may complete a communication connection with respect to the mobile device 305, which is a registration target, so that the vehicle electronic device 300 and the mobile device 305 may be registered in pair. As another example, the mobile device 305 may set and complete a communication connection for directly communicating with the vehicle electronic device 300, so that the vehicle electronic device 300 may be registered in the mobile device 305. Hereinafter, the mobile device 305, for which the registration is completed, as described above, will be referred to as a registered mobile device 305.

When the registration between the mobile device 305 and the vehicle electronic device 300 is completed, the vehicle electronic device 300 may control the first authentication information generated in operation S310 to be transmitted to the registered mobile device 305 through a communication network. Here, the transmission of the first authentication information may be performed through at least one of a short-range wireless communication network or a long distance communication network. For example, the transmission of the first authentication information may be performed through a short-range wireless communication network. A short-range wireless communication network ensures that the mobile device 305 is proximate to the vehicle. As another example, the transmission of the first authentication information may be performed through a long distance communication network. In certain embodiments, the vehicle electronic device 300 can place a phone call to the mobile device 305.

Here, the short-range wireless communication network may include communication networks according to communication standards, such as Bluetooth, Wi-Fi, BLE, and the like. Also, the long distance communication network may include communication networks according to communication standards, such as 3G, 4G, and 5G, or a network for the Internet communication. Here, the communication networks according to the communication standards, such as 3G, 4G, and 5G, may be referred to as mobile communication networks. When the transmission of the first authentication information is performed through the long distance communication network, the first authentication information may be transmitted to a transmission device (for example, a server (not shown), etc.) supporting long distance communication, and the transmission device (for example, the server) may transmit the first authentication information to the mobile device 305.

According to an embodiment of the disclosure, the operation of registering between the mobile device 305 and the vehicle electronic device 300 (S320) and the operation of receiving the first authentication information by the mobile device 305 (S330) will be described in detail hereinafter with reference to FIGS. 13 through 20. Hereinafter, operations S320 and S330 are together referred to as a registration process 301. Specifically, operations included in the registration process 301, whereby the first authentication information is directly transceived between the mobile device 305 and the vehicle electronic device 300, are described in detail hereinafter with reference to FIGS. 13 through 19. Also, operations included in the registration process 301, whereby a server (not shown) performs transmission of data between the mobile device 305 and the vehicle electronic device 300, so that the first authentication information is transmitted to the mobile device 305, are described in detail hereinafter with reference to FIG. 20.

Also, after the registration process 301 is completed, authentication may be performed. An authentication process 302 may include operations S340 through S380, which will be described in detail hereinafter.

To request authentication, first, a first communication connection may be executed (S340). Here, the first communication connection may include a communication connection (or a communication channel) for direct communication between devices. In detail, the first communication connection may include a communication connection for forming a device-to-device (D2D) channel. That is, according to an embodiment of the disclosure, among communication connections via wired or wireless communication networks, a communication connection for directly connecting a device with another device will be separately referred to as "the first communication connection."

More specifically, the first communication connection may include a short-range wireless communication connection for forming the D2D channel. Here, the short-range wireless communication connection may include a communication connection through a short-range wireless communication network according to the short-range wireless communication standards, such as Bluetooth, Wi-Fi, BLE, near-field communication (NFC)/radio-frequency identification (RFID), Wi-Fi direct, ultra-wideband (UWB), Zigbee, and the like.

Also, when a request, for which the authentication is required, occurs, the first communication connection (S340) may be automatically executed in response to the request. Specifically, when a request with respect to a vehicle, in connection with controlling, setting, using, executing services, and/or performing certain operations, is generated or when it is sensed that a user is on board in the vehicle, the first communication connection (S340) may be automatically started in response thereto.

Also, the request with respect to the vehicle, in connection with controlling, setting, using, executing services, and/or performing certain operations, may be received through a user interface (not shown), which is included in the vehicle electronic device 300 or in the vehicle. Alternatively, the described request may be input through a user interface (not shown) of a mobile device (for example, the mobile device 305), which may be connected for communication with the vehicle electronic device 300, and then may be transmitted from the mobile device (for example, the mobile device 305) to the vehicle electronic device 300.

The case where the request is input through the user interface of the mobile device 305 may include examples below. In detail, the mobile device 305, which is used for the vehicle electronic device 300 to perform authentication, may execute an application for performing the authentication with respect to a vehicle. The mobile device 305 may execute the application for performing the authentication with respect to the vehicle and may receive the request described above through a user interface screen that is displayed when the application for performing the authentication with respect to the vehicle is executed. In this case, the application may start the first communication connection in order to transmit the input request to the vehicle electronic device 300.

The mobile device 305 may receive a request of authentication in operation S350 and generate second authentication information based on the first authentication information in response to the received request in operation S360. In detail, the mobile device 305 may generate the second authentication information based on the first authentication information, which is generated by the registered vehicle electronic device 300 which is registered in operation S320. In detail, the second authentication information may be generated by coding and/or modulating the first authentication information. Here, the coding or the modulation may be performed by methods based on an open key, an individual key, a symmetric key, an asymmetric key, hashing, etc. In certain embodiments, the mobile device 305 generates the second authentication information conditioned on a user successfully unlocking the mobile device 305.

Also, in response to the request of authentication, the mobile device 305 may transmit the second authentication information generated in operation S360 to the vehicle electronic device 300 in operation S370.

The vehicle electronic device 300 may control the authentication to be performed in operation S380 based on whether or not the second authentication information transmitted in operation S370 corresponds to the first authentication information generated in operation S310. In detail, the vehicle electronic device 300 may share information about the methods of the coding or the modulation (or algorithms, etc. used for the coding or the modulation) performed by the mobile device 305, in the registration process 301.

Also, when the second authentication information is received in operation S370, the vehicle electronic device 300 may encode or modulate the first authentication information by using the same coding or modulation methods that are used by the mobile device 305 to generate the second authentication information.

Then, the vehicle electronic device 300 may compare a result of coding or modulating the first authentication information with the second authentication information. Also, when it is determined that the result of coding or modulating the first authentication information is the same as the second authentication information, the authentication may be successfully completed. Accordingly, the vehicle electronic device 300 may allow the performance of the request, which is the prerequisite for the authentication. Also, when the result of coding or modulating the first authentication information is not the same as the second authentication information, the vehicle electronic device 300 may determine that the authentication fails and may refuse to perform the request, for which the authentication is performed.

Alternatively, when the second authentication information is received in operation S370, the vehicle electronic device 300 may decode the second authentication information based on the coding or modulation methods used by the mobile device 305 to generate the second authentication information. Also, when a result of decoding the second authentication information is the same as the first authentication information, the vehicle electronic device 300 may control the request, for which the authentication is performed, to be performed. Also, when the result of decoding the second authentication information is not the same as the first authentication information, the vehicle electronic device 300 may refuse to perform the request, for which the authentication is performed.

An example will be described, in which, when a user is on board in a vehicle, authentication is performed to adjust an environment of the vehicle according to the user (for example, a configuration of a user interface screen displayed on a display, an angle and a height of a seat, a location of a handle, a back mirror, and/or cooling or warming temperature-adjustment in the vehicle). According to an embodiment of the disclosure, at a time point after completion of the registration process 301, when the user is in the vehicle, starts up the vehicle, the user can request the adjustments of the environment in the vehicle through a user interface. The user interface can either be on the vehicle electronic device 300, the vehicle, or the mobile device 305.

The vehicle electronic device 300 may transmit a request of authentication to the mobile device 305 in response to the request of the adjustments, in operation S350. Further, the vehicle electronic device 300 may perform the authentication based on the received second authentication information, in operation S380. That is, the vehicle electronic device 300 may perform the authentication based on whether or not the second authentication information corresponds to the first authentication information stored in the vehicle electronic device 300. When the registration of the mobile device 305 and the vehicle electronic device 300 in pair is completed, the mobile device 305 may store the first authentication information generated in the vehicle electronic device 300. Thus, the second authentication information generated by the mobile device 305 and transmitted to the vehicle electronic device 300 may become information corresponding to the first authentication information. Thus, the vehicle electronic device 300 may determine that the second authentication information corresponds to the first authentication information and may complete the authentication in operation S380. When the authentication is completed, the vehicle electronic device 300 or the vehicle (not shown) operating in synchronization with the vehicle electronic device 300 may perform the request, which is a pre-requisite for the authentication. Thus, the environments in the vehicle, such as the angle and the height of the seat, the location of the handle, the back mirror, and/or the cooling and warming temperature-adjustment in the vehicle, may be adjusted according to the user.

As another example, when the first authentication information generated by the vehicle electronic device 300 includes identification information about each of a plurality of users using the vehicle, the vehicle electronic device 300 may perform bespoke operations with respect to a user requesting the authentication, from among the plurality of users, by performing the authentication based on the first authentication information. For example, when legitimate users of the vehicle in which the vehicle electronic device 300 is mounted include user 1 and user 2, and in this case, when the vehicle electronic device 300 succeeds in the authentication by using the first authentication information for identifying user 1, the vehicle electronic device 300 may perform bespoke setting (for example, interface screen setting, environment setting in the vehicle, etc.) of the vehicle for user 1. Also, when the authentication is succeeded by using the first authentication information for identifying user 2, bespoke setting (for example, interface screen setting, environment setting in the vehicle, etc.) of the vehicle for user 2 may be performed.

Also, the authentication process 302 described above may be automatically performed when a request of authentication is input or when a request for a certain operation, which is a prerequisite for authentication, is input. Here, the request of authentication or the request for the certain operation, which is the prerequisite for the authentication, may be input from a user through a user interface (not shown) of at least one of the vehicle electronic device 300 or the mobile device 305.

According to an embodiment of the disclosure, when authentication is requested at a subsequent point after registering the mobile device 305 connected to the vehicle electronic device 300 through a communication connection for directly communicating with the vehicle electronic device 300, the authentication with respect to the vehicle may be easily performed without using an additional hardware device for performing the authentication (for example, the sensors 120 and 215 illustrated in FIGS. 1 and 2, respectively).

In detail, in recent times, most of users using a vehicle have smart phones, which are mobile devices. Also, the vehicle electronic device 300 and the mobile device 305 generally support short-range wireless communication connections, such as a Bluetooth communication connection. Therefore, according to an embodiment of the disclosure, even when a vehicle does not support or provide an additional Internet connection environment or an additional hardware device (for example, the sensors 120 and 215 of FIGS. 1 and 2, respectively) for authentication, authentication with respect to the vehicle may be easily performed by using the short-range wireless communication connection (for example, Bluetooth), which is given already.

Also, when the registration process 301 is performed once before performing authentication, authentication requested at a subsequent point after the registration process 301 may be performed an unlimited number of times.

Also, according to an embodiment of the disclosure, the authentication may be rapidly performed by directly connecting the vehicle electronic device 300 and the mobile device 305, without accessing a server (not shown) for performing the authentication through a long distance communication network in the authentication process 302.

In detail, when the server is to function as a main agent for performing the authentication, the server needs to generate information for authentication and transmit the information to both of the mobile device 305 and the vehicle electronic device 300, and thus, use of data for accessing the server and a calculation load of the server may increase. However, according to an embodiment of the disclosure, when the first authentication information directly generated by the vehicle electronic device 300 is stored in the mobile device 305 in the registration process 301 performed once in advance, the authentication may be rapidly performed without accessing an additional server (not shown) or generating additional authentication information, when the authentication is performed at a subsequent point after the registration process 301.

Figure 4:
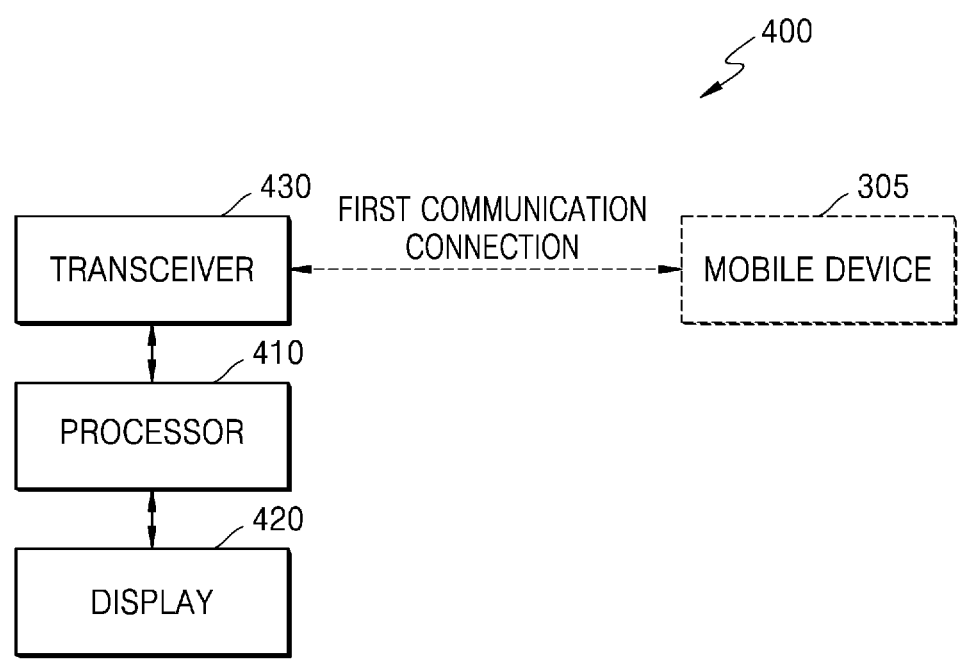
FIG. 4 is a block diagram of a vehicle electronic device according to an embodiment of the disclosure.

FIG. 4 is a block diagram of a vehicle electronic device 400 according to an embodiment of the disclosure.

The vehicle electronic device 400 illustrated in FIG. 4 which may correspond to the vehicle electronic device 300 described in FIG. 3. Referring to FIG. 4, the vehicle electronic device 400 according to an embodiment of the disclosure may include a processor 410, a display 420, and a transceiver 430.

The processor 410 may execute at least one instruction to control desired operations to be performed. Operations performed by the processor 410 will be described in detail hereinafter. The term "processor" shall be understood to include both the singular and plural contexts.

Figure 13:
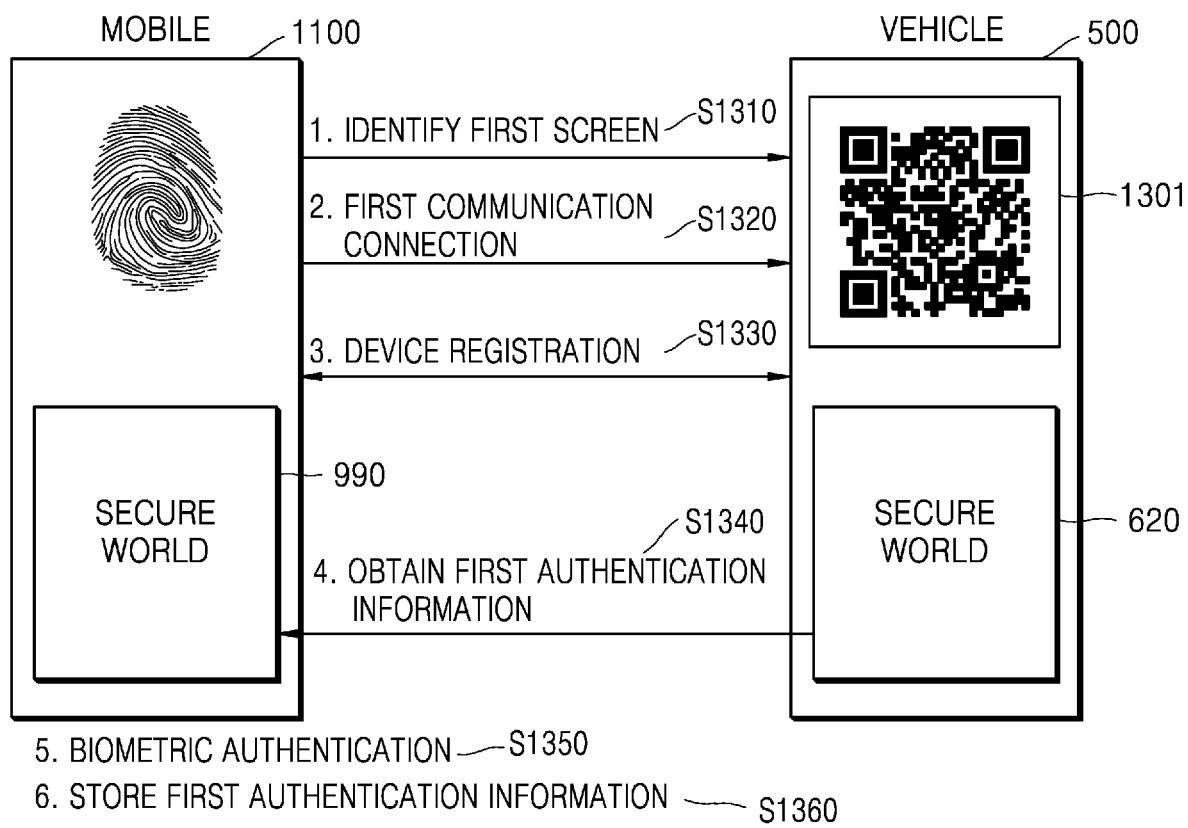
FIG. 13 is a diagram for describing an operation of registering a mobile device in a vehicle, according to an embodiment of the disclosure.

The display 420 may output an image on a screen. In detail, the display 420 may output the image corresponding to video data through a display panel (not shown) included therein, for a user to visually recognize the video data. Here, the screen that is output by the display 420 may include a user interface screen. For example, the display 420 can display coded vehicle identification information in the form of a QR Code, as shown in FIG. 13.

In detail, the display 420 may further include a touch pad (not shown) combined with the display panel. When the display 420 includes the display panel combined with the touch pad, the display 420 may output a user interface screen for receiving a touch input. Also, when a manipulating operation (for example, a touch operation) of a user, the operation corresponding to a certain command, is sensed, the display 420 may transmit the sensed touch input to the processor 410. Then, the processor 410 may analyze the sensed touch input and recognize and execute the certain command that is input by the user.

The transceiver 430 may communicate with another electronic device (not shown) through at least one of a wired communication network or a wireless communication network.

According to an embodiment of the disclosure, the transceiver 430 may communicate with the mobile device 305. Here, the mobile device 305 communicating with the transceiver 430 may refer to the mobile device 305 described in FIG. 3. The processor 410 may generate first authentication information and may control the transceiver 430 to transmit the first authentication information to the registered mobile device 305. Also, the processor 410 may cause the transceiver 430 to send a request for authentication to the mobile device 305, using a first communication connection. The first communication connection can be for directly communicating with the mobile device 305. The processor 410 may control the authentication to be performed based on whether or not it receives second authentication information from the mobile device 305 in response to the request that corresponds to the first authentication information. Here, the second authentication information may be directly received by the vehicle electronic device 400, in detail, by the transceiver 430 from the mobile device 305.

In detail, the processor 410 may control the transceiver 430 to directly transmit the generated first authentication information to the registered mobile device 305. Alternatively, the processor 410 may control the transceiver 430 to transmit the generated first authentication information to the registered mobile device 305 through a transmission device (for example, a server (not shown)). In this case, the transceiver 430 may transmit the first authentication information to the transmission device (for example, the server) under control of the processor 410. Then, the transmission device (for example, the server) receiving the first authentication information may transmit the first authentication information to the mobile device 305 in response to a request, made by the mobile device 305, for the transmission of the first authentication information.

The processor 410 may execute at least one instruction to control at least one of the components included in the vehicle electronic device 400 to perform the operations described above. Here, the at least one instruction may be stored in an internal memory (not shown) included in the processor 410 or a memory (not shown) included in the vehicle electronic device 400, separately from the processor 410.

Hereinafter, the operations of the processor 410 will be described by referring to both FIGS. 3 and 4.

The processor 410 may generate the first authentication information in operation S310. Here, the first authentication information may include unique information indicating at least one of a vehicle or a user, the unique information being used for authentication with respect to the vehicle. Alternatively, the first authentication information may include identification information for identifying at least one of a vehicle or a user from at least one of another vehicle or another user.

The processor 410 may control the first authentication information to be transmitted to the registered mobile device 305. In detail, the processor 410 may complete registration with the mobile device 305 before transmitting the first authentication information. Here, the registration is the same as operation S320 described above, and thus, its detailed description will not be given. Also, after the registration with the mobile device 305 is completed, the processor 410 may control the first authentication information to be transmitted to the registered mobile device 305. For example, the first authentication information generated by the processor 410 may be initially transmitted to a server (not shown), and the server may transmit again the first authentication information to the mobile device 305 registered in the vehicle electronic device 400, so that the first authentication information is transmitted to the mobile device 305. As another example, the first authentication information may be directly transmitted to the mobile device 305 from the vehicle electronic device 400 through a communication network directly connecting the vehicle electronic device 400 and the mobile device 305.

After the registration process 301 is completed, the processor 410 may perform the authentication process 302 at a subsequent point. The processor 410 may transmit a request of authentication to the mobile device 305 through the first communication connection in operation S350. Also, in operation S370, the processor 410 may directly receive the second authentication information from the mobile device 305, the second authentication information being transmitted from the mobile device 305 in response to the request of authentication transmitted in operation S350. Also, the processor 410 may control the authentication to be performed based on whether or not the received second authentication information corresponds to the first authentication information generated in operation S310, in operation S380.

Here, the second authentication information may include authentication information for a single use, which is generated by the mobile device 305 based on the first authentication information. Here, the authentication information for the single use may include a one-time-password (OTP). Here, the OTP may denote information that changes a value for each certain period of time. In detail, the processor 410 may generate the second authentication information that changes its value according to a certain period of time, by coding and/or modulating the first authentication information. Also, the certain period of time, for which the OTP changes the value, may be changed according to a setting of the processor 410 or a setting of a user.

In detail, the processor 410 may control the OTP to have a changed value according to a certain period of time by operating a timer configured to count the certain period of time.

Also, the processor 410 may generally control operations of the vehicle electronic device 400. For example, when the vehicle electronic device 400 includes an electronic device realizing an IVI system, the processor 410 may control operations for realizing the IVI system, such as the operations of radio functions, navigation functions, voice command functions, automatic safety diagnosis functions, etc.

Also, the processor 410 may operate in connection with components included in a vehicle (not shown). An example will be described, in which authentication is granted, when a request, for which the authentication is to be performed, is related to adjustment for optimization with respect to a driver seat (not shown) according to a user. In this case, the processor 410 may transmit the request of adjusting the seat according to the user to a component of the vehicle, which is configured to control the driver seat, so that the driver seat is adjusted according to the user. Accordingly, the component of the vehicle, which is configured to control the driver seat may adjust the driver seat as an optimized height and angle for the user.

Also, the processor 410 may execute at least one of one or more instructions stored therein to perform certain operations. Also, the processor 410 may include a main central processing unit (CPU).

In detail, the processor 410 may include an internal memory (not shown) and at least one processor (not shown) configured to execute at least one program stored in the internal memory. Here, the internal memory (not shown) of the processor 410 may store one or more instructions. Also, the processor 410 may execute at least one of the one or more instructions stored in the internal memory to perform certain operations.

In detail, the processor 410 may include random-access memory (RAM) (not shown) used to store signals or data that is input from the outside or used as a repository corresponding to various operations performed by the vehicle electronic device 400, read-only memory (ROM) (not shown) in which a control program and/or a plurality of instructions for controlling the vehicle electronic device 400 are stored, and at least one processor (not shown).

Also, the processor 410 may include a graphics processing unit (GPU) for processing graphics corresponding to a video. Alternatively, the processor 410 may be realized as a system on chip (SoC) in which a core (not shown) and a GPU (not shown) are combined. Alternatively, the processor 410 may include a multi-core processor. For example, the processor 410 may include dual cores, triple cores, quad cores, hexa cores, octa cores, deca cores, dodeca cores, hexadecimal cores, or the like.

Also, the processor 410 may include components for realizing a hardware platform (for example, an application processor (AP), a memory, etc.) and components for realizing a software platform (for example, an operating system (OS) program, automotive safety software, an application, etc.).

The transceiver 430 may communicate with the mobile device 305 through a first communication connection. In detail, the transceiver 430 may include a first communication module (not shown) for setting the first communication connection. Here, the first communication connection may include a short-range wireless communication connection, and the first communication module may perform communication with an electronic device located in a near distance according to the short-range wireless communication standards. In detail, the transceiver 430 may include at least one short-range wireless communication module (not shown) for performing communication according to the communication standards, such as Bluetooth, Wi-Fi, BLE, NFC/RFID, Wi-Fi direct, UWB, Zigbee, and the like. Also, the short-range wireless communication module may be referred to as a short-range wireless communicator.

Also, the transceiver 430 may further include a long distance communication module (not shown) for performing communication with a server (not shown) for supporting long distance communication according to the long distance communication standards. In detail, the transceiver 430 may include the long distance communication module for performing communication through communication networks according to 3G, 4G, and/or 5G communication standards or a network for Internet communication. Also, the long distance communication module may be referred to as a remote communicator. Here, the communication modules according to the 3G, 4G, and/or 5G communication standards are described as examples of the long distance communication module included in the transceiver 430. However, the long distance communication module is not limited thereto and may include communication modules according to the next-generation communication standards, such as 6G, 7G, etc.

Hereinafter, a communication connection according to the Bluetooth standards is described as an example of the first communication connection. Also, an example in which communication through the Internet network is used as the long distance communication is described. In other words, hereinafter, an example is described, in which communication is performed between the transceiver 430 and a server (not shown) through the Internet network, which is a long distance communication network.

Also, the processor 410 may generate the first authentication information by updating (e.g. modifying and/or refining) the first authentication information for a first cycle and after the first authentication information is updated, may control the first authentication information to be transmitted to the registered mobile device 350. The first cycle may be dependent on the setting of the user or the setting of the processor 410. Alternatively, the processor 410 may modify and refine the first authentication information when a request of the user is input. When, after the first authentication information is generated, authentication is performed by a number of times by using the first authentication information, it is required to enhance the security with respect to the first authentication information by changing the first authentication information. That is why the processor 410 may modify and refine the first authentication information for each cycle.

Figure 5:
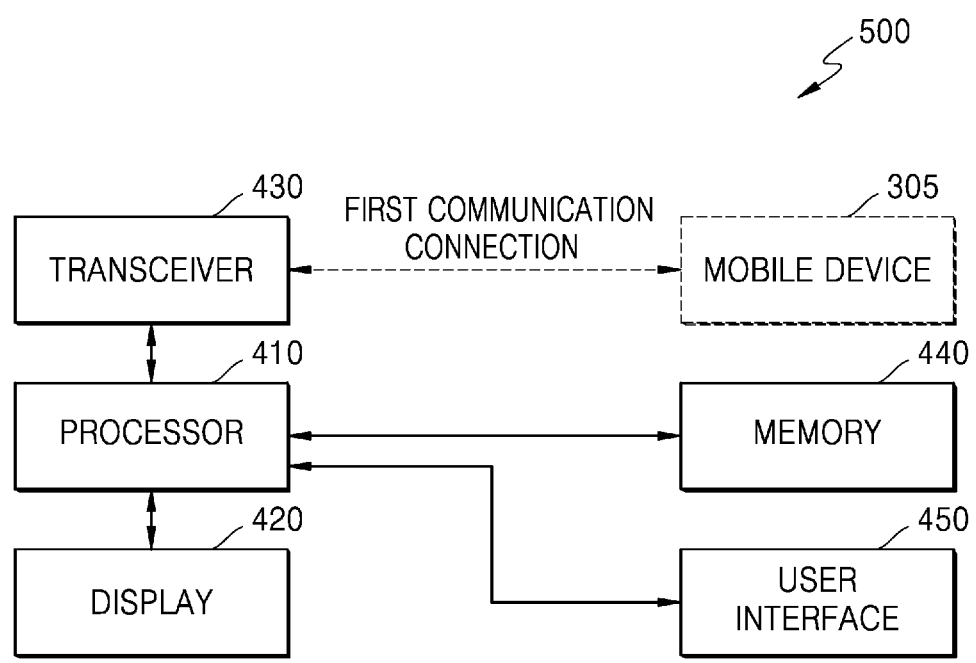
FIG. 5 is a block diagram of a vehicle electronic device according to another embodiment of the disclosure.

FIG. 5 is a block diagram of a vehicle electronic device 500 according to another embodiment of the disclosure.

The vehicle electronic device 500 of FIG. 5 may correspond to the vehicle electronic devices 300 and 400 described in FIGS. 3 and 4. The vehicle electronic device 500 may further include at least one of a memory 440 or a user interface 450.

The memory 440 may store at least one of data, one or more programs, one or more instructions, or one or more applications.

In detail, the memory 440 may store one or more instructions. Also, the memory 440 may store the one or more instructions executed by the processor 410. Also, the memory 440 may store the one or more programs executed by the processor 410. Thus, the processor 410 may control the operations according to an embodiment of the disclosure to be performed by executing at least one of the one or more instructions included in the memory 440. Execution of the instructions by the processor causes the processor to perform certain operations.

Also, although the memory 440 is illustrated as separate from the processor 410, the memory 440 may also be provided in the form in which the memory 440 is included in the processor 410.

According to an embodiment of the disclosure, the memory 440 may store the first authentication information. The memory 440 may include at least one type of storage medium from a flash memory-type storage medium, a hard disk-type storage medium, a multimedia card micro-type storage medium, a card-type memory (for example, SD or XD memory), RAM, static RAM (SRAM), ROM, electrically erasable-programmable ROM (EEPROM), programmable ROM (PROM), a magnetic memory, a magnetic disk, and an optical disk.

Also, the memory 440 may include a secure area and a general area. In certain embodiments, access to the secure area is only permitted by a virtual processor that allows trusted applications to access. The secure area can comprise, for example, Secure World (SWD) zone corresponding to Trustzone™, while the general area can correspond to the normal world (NWD). The processor 410 may control the first authentication information to be stored in the SWD zone included in the memory 440. Here, the Trustzone is a type of hardware security technique, which is configured to divide a hardware device, such as the memory 440, into a normal world (NWD) zone and the SWD zone corresponding to the Trustzone, and to disallow an access from the NWD zone to the resources of the SWD zone, so as to protect data which is input into the SWD zone and stored in the SWD zone.

The memory 440 including the SWD zone will be described in detail hereinafter with reference to FIG. 6.

The user interface 450 may receive a user input for controlling the vehicle electronic device 500. The user interface 450 may include a user input device, such as a touch panel configured to sense a user's touch operation, a button configured to receive a user's push operation, a wheel configured to receive a user's rotation-manipulating operation, a keyboard, and a dome switch, but is not limited thereto. Also, each of the button, the wheel, and the dome switch may include a key corresponding to each different function.

For example, the user interface 450 may include an "authentication button," and when a push operation with respect to the authentication button is sensed, the processor 410 may control the authentication process 302 to be executed. As another example, the user interface 450 may include a button corresponding to "personalized environment setting," and when a push operation with respect to the button corresponding to the personalized environment setting is sensed, the processor 410 may control the authentication process 302 to be executed in response to this push operation.

Also, the user interface 450 may include a sound recognition device (not shown) for performing sound recognition. For example, the sound recognition device may include a microphone, and the sound recognition device may receive a user's voice command or a sound request. Accordingly, the processor 410 may control operations corresponding to the voice command or the sound request to be performed.

Also, the user interface 450 may include a motion sensor (not shown). For example, the motion sensor may sense a user's motion in a vehicle and may receive the sensed motion as a user input. Also, the sound recognition device and the motion sensor described above may not be provided in the form in which the sound recognition device and the motion sensor are included in the user interface 450. Rather, the sound recognition device and the motion sensor may be included in the vehicle electronic device 500 as separate modules from the user interface 450.

Alternatively, the sound recognition device and the motion sensor described above may be devices, which are included in a vehicle (not shown) in addition to the vehicle electronic device 500. In this case, the user input sensed by the sound recognition device and the motion sensor may be transmitted to the processor 410. Then, the processor 410 may control operations corresponding to the user input received by the sound recognition device and the motion sensor to be performed.

Also, the vehicle electronic device 500 may further include a UWB sensor (not shown). In this case, the processor 410 may identify whether a user is present in a vehicle (not shown) based on a result of a sensing operation of the UWB sensor. Here, the UWB sensor may recognize whether a user exists within a near distance based on a UWB signal. Thus, because the UWB sensor uses the communication principle of an UWB signal, the UWB sensor may be provided in the form of a UWB communication module, which is included in the transceiver 430.

Also, when the user is present in the vehicle, the processor 410 may control the authentication process 302 to be performed. When the user is not present in the vehicle and operations of controlling, setting, using, service executing, and/or certain functions of the vehicle are requested, there is a probability of authentication being performed by hacking. Thus, when the processor 410 performs the authentication process 302 only when the user is present in the vehicle, the security performance of the authentication may be enhanced.

According to an embodiment of the disclosure, the processor 410 may automatically execute the authentication process 302 when a request of authentication is input or a request for which authentication is to be performed is input. In detail, when a user's manipulating operation corresponding to the request of authentication is sensed (for example, when a push operation with respect to the authentication button is sensed) through the user interface 405, the processor 410 may control the authentication process 302 to be executed. Alternatively, when the request for which the authentication is to be performed is input (for example, when a push operation with respect to the button corresponding to personalized environment setting is sensed) through the user interface 405, the processor 410 may automatically control the authentication process 302 to be executed.

Figure 6:
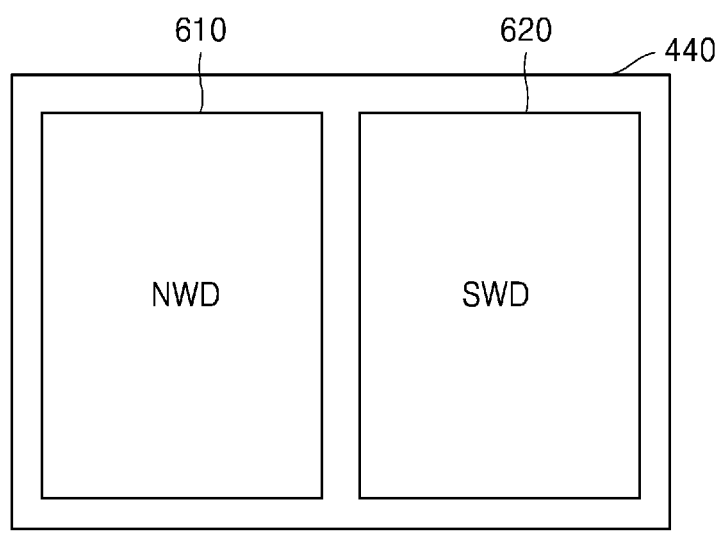
FIG. 6 is a block diagram of a memory according to an embodiment of the disclosure.

FIG. 6 is a block diagram of the memory 440 according to an embodiment of the disclosure.

Referring to FIG. 6, the memory 440 may include a secure area (e.g., SWD zone) 620. Also, the first authentication information may be stored in the secure area 620 in the memory 440.

In detail, the memory 440 may be divided into general area (e.g., NWD zone) 610 and the secure area 620 corresponding to the Trustzone. Based on a method of setting the Trustzone, the NWD zone 610 may not access the resources in the secure area 620. Thus, to overcome the security problem such as a leakage of the first authentication information generated for the authentication, the processor 410 may control the first authentication information to be generated and stored in the secure area 620.

Also, the processor 410 may control an OTP value, which is the second authentication information generated based on the first authentication information stored in the secure area 620, to be updated according to a certain period of time, by driving a timer configured to count the certain period of time.

Also, FIG. 6 illustrates the example in which the secure area 620 is included in the memory 440. However, the secure area 620 may be included in the processor 410. In detail, part of a repository (or a memory device, etc.) included in the processor 410 may be formed as the secure area 620, and the first authentication information may be stored in the secure area 620 formed in the processor 410.

According to an embodiment of the disclosure, in order to enhance the security performance of authentication, the first authentication information may be stored in the secure area 620, such as a SWD zone corresponding to the Trustzone. Also, the second authentication information may be generated as an OTP value which is valid for only a certain period of time, in order to increase the security performance with respect to the second authentication information.

Figure 7:
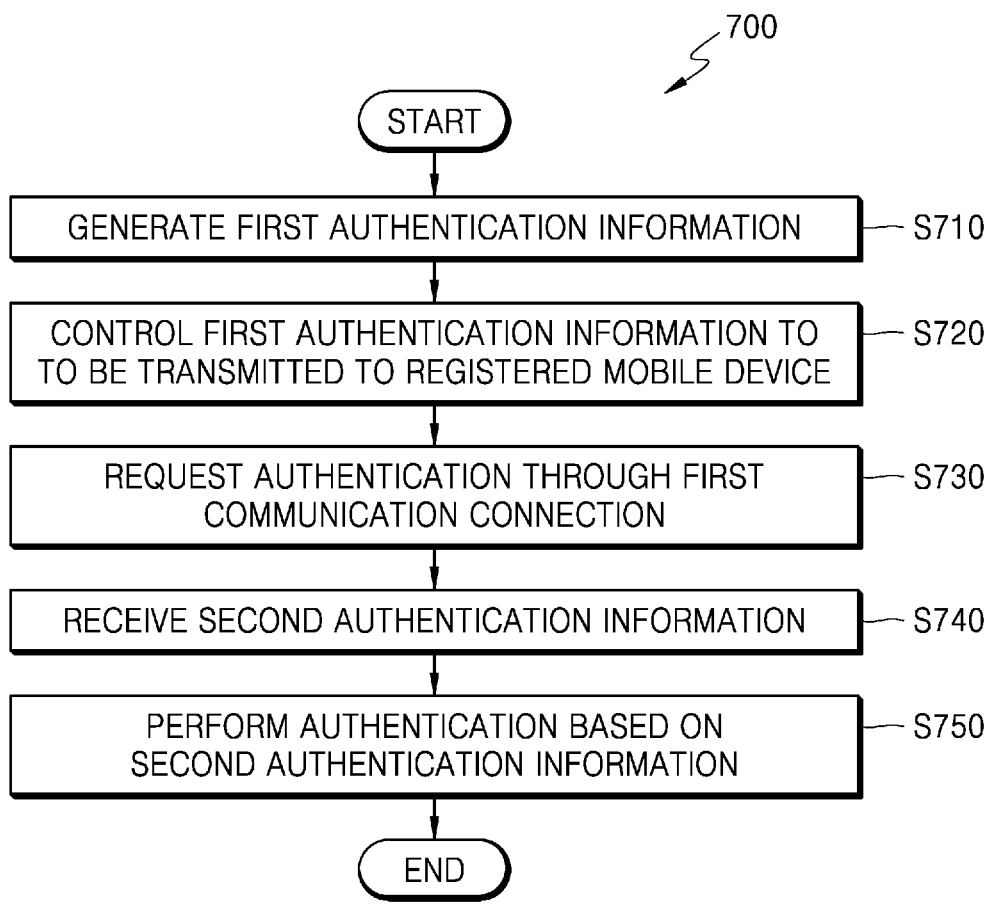
FIG. 7 is a flowchart of operations of a vehicle electronic device, according to an embodiment of the disclosure.

FIG. 7 is a flowchart of operations of a vehicle electronic device according to an embodiment of the disclosure. In detail, FIG. 7 is the flowchart of operations performed by the vehicle electronic device 300, 400, or 500 according to the embodiments of the disclosure described with reference to FIGS. 3 through 6 for authentication with respect to a vehicle. Also, FIG. 7 is the flowchart of a vehicle authentication method 700, according to an embodiment of the disclosure. The vehicle authentication method 700 may be performed by the vehicle electronic device 300, 400, or 500. Thus, when describing the vehicle authentication method 700 illustrated in FIG. 7, descriptions of aspects that are the same as the aspects of the vehicle electronic device 300, 400, or 500 described with reference to FIGS. 3 through 6 will not be given.

Referring to FIG. 7, according to the vehicle authentication method 700, the first authentication information may be generated in the vehicle in operation S710. In detail, operation S710 may correspond to operation S310 and may be performed by the processor 410 of the vehicle electronic device 300, 400, or 500.

The first authentication information generated by the vehicle electronic device 300, 400, or 500 may be controlled to be transmitted to the registered mobile device (for example, the mobile device 305 of FIG. 3) in operation S720. That is, the first authentication information generated by the vehicle electronic device 300, 400, or 500 may be controlled to be received by the registered mobile device (for example, the mobile device 305 of FIG. 3) in operation S720. Hereinafter, a case in which the registered mobile device is the mobile device 305 illustrated in FIG. 3 will be described as an example. Operation S720 may correspond to operation S330 and may be performed under control of the processor 410 of the vehicle electronic device 300, 400, or 500.

In detail, operation S720 may be performed by the vehicle electronic device 300, 400, or 500 by directly transmitting the first authentication information to the mobile device 305 through a first communication connection. In the vehicle authentication method 700, operations included in operations S710 and S720 may correspond to the registration process 301 described in FIG. 3. Also, operations included in operations S730, S740, and S750 may correspond to the authentication process 302 described in FIG. 3.

Operations included in the registration process 301, whereby the first authentication information is directly received and transmitted between the mobile device 305 and the vehicle electronic device 300, 400, or 500, are described in detail hereinafter with reference to FIGS. 13 through 19.

Also, the registration process 301 may be performed such that a server (not shown) may perform transmission of data between the mobile device 305 and the vehicle electronic device 300 to transmit the first authentication information to the mobile device 305. In detail, operation S720 may include transmission of the first authentication information generated by the vehicle electronic device 300, 400, or 500 to the server and transmission of the first authentication information from the server to the registered mobile device 305. Operations performed in the case where the first authentication information is transmitted via the transmission of the server will be described in detail hereinafter with reference to FIG. 20.

Next, a request of authentication may be transmitted to the mobile device 305 through the first communication connection for directly communicating with the mobile device (for example, the mobile device 305 of FIG. 3), in operation S730. Operation S720 may identically correspond to operation S330 and may be performed under control of the processor 410 of the vehicle electronic device 300, 400, or 500.

Also, in operation S740, the second authentication information may be directly transmitted from the mobile device (for example, the mobile device 305 of FIG. 3) in response to the request of authentication, which is transmitted in operation S730. Operation S740 may correspond to operation S370 and may be performed under control of the processor 410 of the vehicle electronic device 300, 400, or 500.

In operation S750, when the second authentication information is received, the authentication may be controlled to be performed based on whether or not the received second authentication information corresponds to the first authentication information generated in operation S710. Operation S750 may correspond to operation S380 and may be performed under control of the processor 410 of the vehicle electronic device 300, 400, or 500.

As described above with reference to FIGS. 3 through 7, the vehicle electronic device 300, 400, or 500 according to an embodiment of the disclosure may generate the first authentication information and perform the registration process with the mobile device (for example, the mobile device 305), so that the registered mobile device 305 may receive and store the first authentication information. Thereafter, when authentication is requested at a subsequent point after the registration, the authentication may be performed by directly connecting the vehicle electronic device 300, 400, or 500 with the registered mobile device 305, without including, in a vehicle, an additional hardware device (for example, a sensor device, etc. for fingerprint recognition) for performing authentication nor using a server (not shown) performing transmission through the Internet communication.

Figure 8:
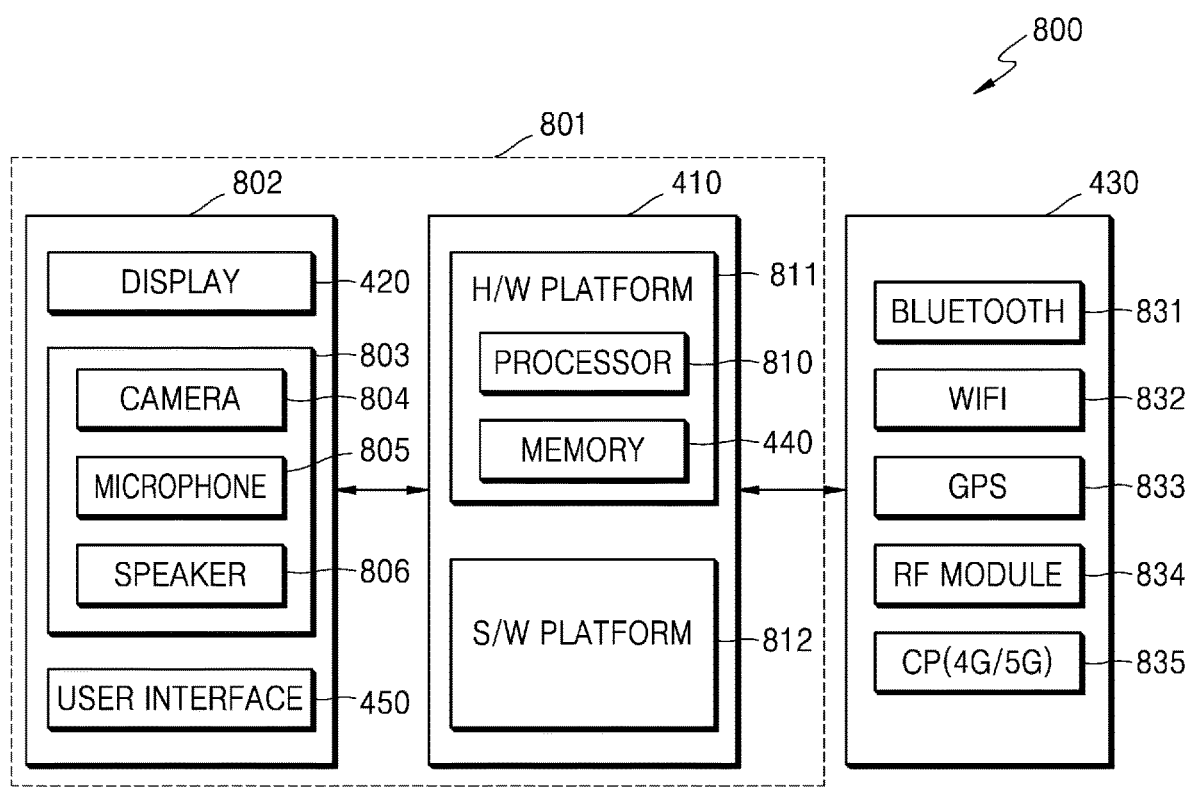
FIG. 8 is a block diagram of a vehicle electronic device according to another embodiment of the disclosure.

FIG. 8 is a block diagram of a vehicle electronic device 800 according to another embodiment of the disclosure.

The vehicle electronic device 800 of FIG. 8 may correspond to the vehicle electronic device 300, 400, or 500 described with reference to FIGS. 3 through 7 according to an embodiment of the disclosure. Thus, when describing the vehicle electronic device 800, descriptions of aspects that are the same as the aspects of the vehicle electronic device 300, 400, or 500 will not be given. Also, in describing the vehicle electronic device 800 illustrated in FIG. 8, descriptions of components that are the same as the components described in FIGS. 3 through 7 will be given by using the same reference numerals and the same names.

Referring to FIG. 8, the vehicle electronic device 800 may include the processor 410, an inputter/outputter 802, and the transceiver 430. In detail, the vehicle electronic device 800 may include an electronic device for realizing the IVI technologies. Here, the processor 410 and the input/output 802 may be together referred to as an IVI head unit. Also, the vehicle electronic device 800 may be arranged at a central front portion of a vehicle between a driver seat and an assistant seat.

Also, the transceiver 430 may be referred to as a transmission control unit (TCU).

Here, the TCU may be configured to control receiving and transmitting of data in the vehicle and may be in charge of communication between the vehicle and external electronic devices (for example, a server, a mobile device, etc.).

Also, the processor 410 may include components 811 (for example, an AP, a memory, etc.) for realizing a hardware platform and components 812 (for example, an OS program, automotive safety software, an application, etc.) for realizing a software platform.

In detail, the components 811 for realizing the hardware platform may include at least one AP 811 and the memory 440. Here, the memory 440 is the same as the memory 440 described with reference to FIG. 5. Also, in FIG. 8, a case in which the memory 440 is included in the processor 410 is described as an example. Also, the memory 440 may not be included in the processor 410 and may be included in the vehicle electronic device 800 as a separate component from the processor 410. Here, the AP 811 may include Exynos (for example, Exynos 8870), etc.

Also, the components 811 for realizing the hardware platform may further include a universal serial bus (USB) module (not shown), a frequency modulation (FM)/digital multimedia broadcasting (DMB) tuner (not shown), etc. Here, the USB module may include a USB insertion unit (not shown) and may read data from an inserted USB. Also, the FM/DMB tuner may selectively receive FM/DMB broadcasting signals. In detail, the FM/DMB tuner may tune and select only frequencies of a channel to be received by the vehicle electronic device 800, from a plurality of electromagnetic wave components, through performing amplification, mixing, resonance, etc. on wirelessly received broadcasting signals. The broadcasting signals received by the FM/DMB tuner may include audio data, video data, and additional data (for example, an electronic program guide (EPG)).

The components 812 for realizing the software platform may include OS programs, automotive safety software, applications, etc. Here, the OS programs may include QNX, Linux, and Android-based OS programs.

The input/output 802 may be configured to provide data to a user or receive a user's request and may include at least one of the display 420, a camera module 803, or the user interface 450.

The camera module 803 may be configured to obtain image and sound data and may include a camera 804 and a microphone 805. Also, the camera module 803 may include a speaker 806 for outputting operation sounds, etc. of the camera 804. Also, the speaker 806 may be a separate component from the camera module 803 and may perform an audio output operation. Also, the camera module 803 may operate as a sensor for recognizing a gesture and sound of a user.

In detail, the camera 804 may receive an image (for example, sequential frames) corresponding to a user motion including a gesture within a recognition range of the camera 804. For example, the recognition range of the camera 804 may correspond to a distance of about 0.1 m to about 5 m between the camera 804 and the user. The user motion may include, for example, a part of a body of the user, such as a user's face, a facial expression, a hand, a fist, a finger, etc., or a motion thereof. The camera 804 may recognize the received image by converting the received image into an electrical signal under control of the processor 410 and may select a menu displayed on the vehicle electronic device 800 by using a result of the recognition corresponding to the user motion or may perform an control operation corresponding to the result of the recognition corresponding to the user motion. For example, the processor 410 may perform control operations, such as channel selection, channel switching, volume adjustment, and execution of available services in FM/DMB, by using the result of the recognition obtained by the camera 804.

The camera 804 may be realized as an integral type to the vehicle electronic device 800 or a separate type from the vehicle electronic device 800. The camera 804 which is realized as a separate type may be electrically connected to the processor 410 of the vehicle electronic device 800 through the transceiver 430 or the input/output 802. For example, when the camera 804 is realized as a separate type from the vehicle electronic device 800, the camera 804 may be arranged in locations corresponding to a face of a driver and the entire upper body of the driver, to capture images corresponding to the face of the driver and the entire upper body of the driver.

The microphone 805 may receive a sound signal. The microphone 805 may receive the sound signal of a user, and the processor 410 may recognize a control command corresponding to the sound received by the microphone 805 and control an operation corresponding to the recognized control command to be performed.

The user interface 450 may receive a user input for controlling the vehicle electronic device 500. The user interface 450 may include a push button, a wheel, a keyboard, a jog dial, a touch panel, and a haptic sensor for receiving a user input.

The transceiver 430 may include at least one of a Bluetooth module 831, a WiFi module 832, a GPS module 833, an RF module 834, or a communication processor (CP) module 835. Here, the CP module may include a modem chip set and may perform communication with external electronic devices through a communication network according to the 3G, 4G, or 5G communication standards. Also, the transceiver 430 may further include at least one communication module (not shown) for performing communication according to the communication standards, such as BLE, NFC/RFID, Wi-Fi direct, UWB, and/or Zigbee.

Also, the components of the vehicle electronic device 800, for example, the processor 410, the input/output 802, and the transceiver 430 may communicate with one another through a vehicle network. Also, the components of the vehicle electronic device 800 and other components included in the vehicle may communicate with each other through the vehicle network. Here, the vehicle network may include a controller area network (CAN) and/or a network based on media-oriented system transport (MOST).

Hereinafter, with reference to FIGS. 9 through 11, a mobile device 900 according to an embodiment of the disclosure will be described in detail.

Figure 9:
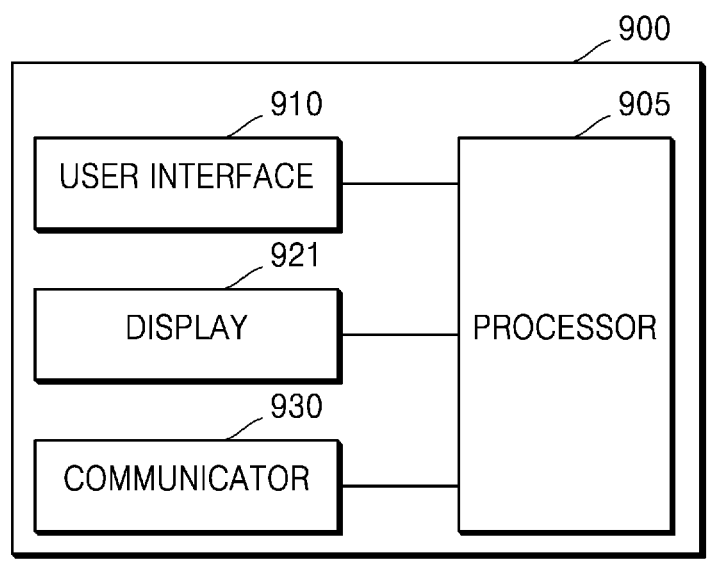
FIG. 9 is a block diagram of a mobile device according to an embodiment of the disclosure.

FIG. 9 is a block diagram of the mobile device 900 according to an embodiment of the disclosure. The mobile device 900 illustrated in FIG. 9 may identically correspond to the mobile device 305 described in FIG. 3. Thus, in describing the mobile device 900, descriptions of aspects that are the same as the aspects of the mobile device 305 will not be given.

The mobile device 900 may perform communication with the vehicle electronic device 300, 400, 500, or 800 so that authentication with respect to a vehicle may be performed. That is, the mobile device 900 may communicate with the vehicle electronic device 300, 400, 500, or 800 so as to be used for the authentication of the vehicle. The vehicle electronic device 300, 400, 500, or 800 communicating with the mobile device 900 is described in detail with reference to FIGS. 3 through 8, and thus, its detailed descriptions will not be given.

Referring to FIG. 9, the mobile device 900 may include a processor 905, a user interface 910, a display 921, and a communicator 930. Structures and operations of the user interface 910, the display 921, and the communicator 930 may correspond to the structures and operations of the user interface 450, the display 420, and the transceiver 430, respectively, described with reference to FIGS. 4 and 5, and thus, their detailed descriptions will not be given.

According to an embodiment of the disclosure, the processor 905 may receive and store first authentication information generated by a registered vehicle electronic device (not shown). Also, when a request of authentication is received through a first communication connection for directly communicating with the vehicle electronic device 300, 400, 500, or 800, the processor 905 may generate second authentication information corresponding to the first authentication information. Also, the processor 905 may control the communicator 940 to transmit the second authentication information to the vehicle electronic device 300, 400, 500, or 800 through the first communication connection. Here, the second authentication information may be directly transmitted from the mobile device 900 to the vehicle electronic device 300, 400, 500, or 800.

In detail, the processor 905 may execute at least one instruction to control at least one of components included in the mobile device 900 to perform the operations described above. Here, the at least one instruction executed by the processor 905 may be stored in a memory (not shown) included in the processor 905. Alternatively, the at least one instruction executed by the processor 905 may be included in a memory (not shown), which is included in the mobile device 900 as a separate component from the processor 905.

Hereinafter, operations of the mobile device 900 will be described by referring to both FIGS. 3 and 9.

The processor 905 may receive and store the first authentication information generated by the registered vehicle electronic device 300, 400, 500, or 800, in operation S330. Here, the first authentication information may be directly received by the processor 905 from the vehicle electronic device 300, 400, 500, or 800, through the first communication connection, in the registration process 301.

Also, the first authentication information may be received by the processor 905 through a server (not shown) transmitting the first authentication information.

In detail, the processor 905 may control the communicator 930 to receive the first authentication information generated by the registered vehicle electronic device 300, 400, 500, or 800 from the server. In detail, the processor 905 may transmit identification information about the vehicle to the server and request the first authentication information corresponding to the identification information about the vehicle to be transmitted, wherein the identification information about the vehicle is obtained by the processor 905 in the registration process 301.

Also, when the request of authentication is received through the first communication connection for directly communicating with the vehicle electronic device 300, 400, 500, or 800 in operation S350, the processor 905 may generate the second authentication information corresponding to the first authentication information in operation S360. Here, the second authentication information may include authentication information for a single use, which is generated by the mobile device 305 based on the first authentication information. Here, the authentication information for the single use may include an OTP.

Also, the second authentication information may be transmitted to the vehicle electronic device 300, 400, 500, or 800 through the first communication connection in operation S370. That is, the second authentication information may be directly transmitted from the mobile device 900 to the vehicle electronic device 300, 400, 500, or 800.

In detail, the processor 905 may generate the second authentication information based on the first authentication information generated by the registered vehicle electronic device (for example, the vehicle electronic device 300). In detail, the processor 905 may generate the second authentication information by coding and/or modulating the first authentication information. Here, the coding or the modulation may be performed by methods based on an open key, an individual key, a symmetric key, an asymmetric key, hashing, etc. Also, information used by the processor 905 to generate the second authentication information, the information being related to coding or modulation methods (or algorithms used for the coding or the modulation), may be shared between the mobile device 900 and the vehicle electronic device (for example, the vehicle electronic device 300) in the registration operation S320.

As described above, the vehicle electronic device 300, 400, 500, or 800 connected to the mobile device 900 through the first communication connection may perform the authentication by using the second authentication information transmitted from the mobile device 900.

Also, although not illustrated in FIG. 9, the mobile device 900 may further include at least one sensor configured to sense biometric information. Hereinafter, the at least one sensor configured to sense the biometric information will be referred to as a biometric sensor (not shown).

Also, when the request of authentication is received in operation S350, the processor 905 may sense biometric information of a user by using the biometric sensor and when the sensed biometric information corresponds to registered biometric information, which is biometric information of a registered user, may generate the second authentication information corresponding to the first authentication information. Here, the registered user may denote a legitimate user of the mobile device 900.

When the mobile device 900 and the vehicle electronic device 300, 400, 500, or 800 are registered in pair, the mobile device 900 and a vehicle including the vehicle electronic device 300, 400, 500, or 800 may be owned by the same person. For example, the owner of the vehicle may register his/her own mobile device, namely, a smart phone, in the vehicle electronic device 300, 400, 500, or 800 included in the vehicle and may request the vehicle electronic device 300, 400, 500, or 800 to perform authentication by using the smart phone.

According to an embodiment of the disclosure, the security performance of the authentication may be increased by controlling the second authentication information to be generated only when the biometric information of the registered user is sensed.

The biometric sensor (which is not shown in FIG. 9 and may correspond to a biometric sensor 991 shown in FIG. 10) may be configured to sense biometric information of a user of the mobile device 900 and may include a fingerprint recognition sensor, an iris recognition sensor, etc. Hereinafter, an example in which the biometric sensor includes the fingerprint recognition sensor will be described.

Also, the mobile device 900 may further include a camera (not shown). Then, the processor 905 may recognize, via the camera, coded vehicle identification information displayed on the vehicle electronic device 300, 400, 500, or 800 transmitting the request of authentication and may complete the first communication connection by using the coded vehicle identification information. The operation of setting the first communication connection using the coded vehicle identification information will be described in detail with reference to FIGS. 13 through 15.

Also, the processor 905 may include a secure area, such as SWD zone (not shown) corresponding to Trustzone and may control the first authentication information to be stored in the secure area. Here, the secure area included in the processor 905 may be the same as the secure area 620 described in FIG. 6, and thus, its detailed description will not be given.

Also, the mobile device 900 may further include a memory (not shown). Also, the memory may include a secure area (not shown), such as a SWD zone corresponding to Trustzone. In this case, the processor 905 may control the first authentication information to be stored in the secure area included in the memory.

Figure 10:
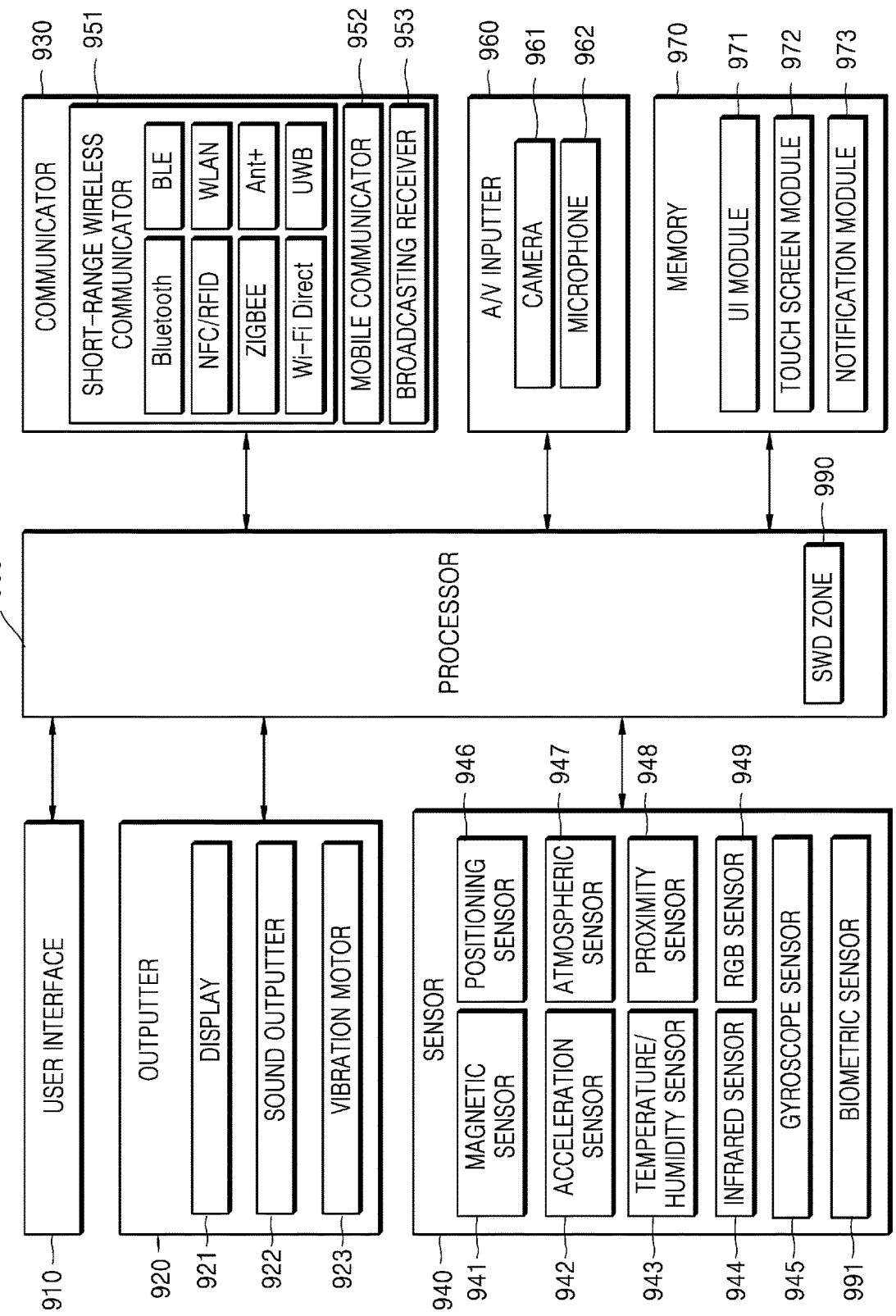
FIG. 10 is a block diagram of a mobile device according to another embodiment of the disclosure.

Also, the processor 905 may control the operation of generating the second authentication information based on the first authentication information to be performed in the secure area (not shown in FIG. 9 and may correspond to a secure area (SWD zone) 990 illustrated in FIG. 10). In detail, the processor 905 may store coding or modulation algorithms (or programs) used to generate the second authentication information in the secure area and control the second authentication information to be generated by using the coding or modulation algorithms stored in the secure area.

FIG. 10 is a block diagram of a mobile device 1100 according to another embodiment of the disclosure.

The mobile device 1100 may correspond to the mobile devices 300 and 900 illustrated in FIGS. 3 and 9, respectively, and components of the mobile device 1100, which are the same as the components of the mobile device 900, are illustrated by using the same reference numerals. Thus, in describing the mobile device 1100, the same aspects as the mobile devices 300 and 900 described with reference to FIGS. 3 through 9 will not be repetitively described.

Referring to FIG. 10, compared to the mobile device 900, the mobile device 1100 may further include at least one of an outputter 920, a sensor 940, an audio/video (A/V) inputter 960, or a memory 970.

A user interface 910 may denote a device via which a user inputs data for controlling the mobile device 1100. For example, the user interface 910 may include a key pad, a dome switch, a touch pad (a touch capacitance method, a pressure-resistive layer method, an infrared sensing method, a surface ultrasonic conductive method, an integral tension measuring method, a piezo effect method, etc.), a jog wheel, a jog switch, etc., but is not limited thereto.

The user interface 910 may receive a user input of selecting a virtual image to be displayed. Also, the user interface 910 may receive a user input for setting operations of the virtual image and a user input for purchasing items related to the virtual image.

The outputter 920 may output an audio signal, a video signal, or a vibration signal. Also, the outputter 920 may include a display 921, a sound outputter 922, and a vibration motor 923.

The display 921 may display and output information processed in the mobile device 1100. For example, the display 921 may display the user interface 910 for selecting a virtual image, the user interface 910 for setting operations of the virtual image, and the user interface 910 for purchasing items related to the virtual image.

When the display 921 is formed as a touch screen in which a display panel (not shown) and a touch pad (not shown) are combined in a layer structure, the display 921 may also be used as an input device, in addition to an output device. The display 921 may include at least one of a liquid crystal display, a thin-film transistor-liquid crystal display, an organic light-emitting diode, a flexible display, a three-dimensional (3D) display, or an electrophoretic display. According to a form in which the mobile device 1100 is realized, the mobile device 1100 may include at least two displays 921. Here, the at least two displays 921 may be arranged to face each other based on a hinge.

The sound outputter 922 may output audio data received from the communicator 930 or stored in the memory 970. Also, the sound outputter 922 may output a sound signal related to functions (for example, a call signal reception sound, a message reception sound, a notification sound, etc.) performed in the mobile device 1100. Also, the sound outputter 922 may include a speaker, a buzzer, etc.

The vibration motor 923 may output a vibration signal. For example, the vibration motor 923 may output the vibration signal corresponding to an output of the audio data or the video data (for example, a call signal reception sound, a message reception sound, etc.). Also, the vibration motor 923 may output the vibration signal when a touch is input in the touch screen.

The processor 905 may generally control operations of the mobile device 1100. For example, the processor 905 may execute programs stored in the memory 970 to generally control the user interface 910, the outputter 920, the sensor 940, the communicator 930, the A/V inputter 960, etc.

According to an embodiment of the disclosure, the processor 905 may include the secure area 990 described with reference to FIGS. 6 and 9. Also, the processor 905 may control the first authentication information to be stored in the secure area 990. Also, the secure area 990 may be included such that the secure area 990 is included in the memory 970.

The sensor 940 may sense states of the mobile device 1100 or states around the mobile device 1100 and may transmit sensed information to the processor 905.

The sensor 940 may include the biometric sensor 991. In detail, the sensor 940 may be configured to sense biometric information of a user of the mobile device 1100 and may include a fingerprint recognition sensor, an iris recognition sensor, etc. Hereinafter, an example in which the biometric sensor includes the fingerprint recognition sensor will be described.

Also, the sensor 940 may further include at least one of a magnetic sensor 1410, an acceleration sensor 1420, a temperature/humidity sensor 1430, an infrared sensor 1440, a gyroscope sensor 1450, a positioning sensor (for example, a GPS) 1460, an atmospheric sensor 1470, a proximity sensor 1480, or an RGB sensor (an illuminance sensor) 1490, but is not limited thereto. A function of each sensor may be intuitively inferred by one of ordinary skill in the art based on a name of the sensor, and thus, its detailed description is omitted.

The communicator 930 may include one or more components configured to enable communication with at least one of an external device (for example, a vehicle electronic device, etc.), a head mounted display (HMD) device (not shown), or a server. For example, the communicator 930 may include a short-range wireless communicator 951, a mobile communicator 952, a broadcasting receiver 953.

The short-range wireless communicator 951 may include a Bluetooth communicator, a BLE communicator, a near-field communicator, a WLAN (Wi-Fi) communicator, a Zigbee communicator, an infrared data association (IrDA) communicator, a Wi-Fi direct (WFD) communicator, a UWB communicator, an Ant+ communicator, etc., but is not limited thereto.

The mobile communicator 952 may transceive wireless signals with at least one of a base station, an external terminal, or a server, through a mobile communication network. Here, the wireless signals may include a sound call signal, a video call signal, or various types of data according to transceiving of a text/multimedia message. In detail, the mobile communicator 952 may perform communication through a mobile communication network according to the 3G, 4G, or 5G communication standards.

The broadcasting receiver 953 may receive broadcasting signals and/or broadcasting-related information from the outside through broadcasting channels. The broadcasting channels may include satellite channels and ground wave channels. According to an example, the mobile device 1100 may not include the broadcasting receiver 953.

According to an embodiment of the disclosure, the communicator 930 may perform communication with the vehicle electronic device 300, 400, 500, or 800 through the first communication connection described above. Also, the communicator 930 may receive the first authentication information by communicating with a server (not shown) through a long distance communication network.

The A/V inputter 960 may be configured to input an audio signal or a video signal and may include a camera 961 and a microphone 962. The camera 961 may obtain an image frame, such as a still image or a video, through an image sensor in a video telephony mode or a capturing mode. An image captured by the image sensor may be processed by the processor 905 or an additional image processor (not shown).

The image frame processed by the camera 961 may be stored in the memory 970 or transmitted to the outside through the communicator 930. The camera 961 may include two or more cameras according to a structure of a terminal.

The microphone 962 may receive an external sound signal and process the sound signal into electrical sound data. For example, the microphone 962 may receive the sound signal from an external device or a speaker. The microphone 962 may use various noise removal algorithms for removing noise occurring when the external sound signal is input.

The memory 970 may store programs for a processing and controlling operation of the processor 905 and may store data that is input in the mobile device 1100 or output from the mobile device 1100.

The memory 970 may include at least one type of storage medium from a flash memory-type storage medium, a hard disk-type storage medium, a multimedia card micro-type storage medium, a card-type memory (for example, SD or XD memory), RAM, SRAM, ROM, EEPROM, PROM, a magnetic memory, a magnetic disk, or an optical disk.

The programs stored in the memory 970 may be divided into a plurality of modules according to functions. For example, the programs may be divided into a user interface (UI) module 971, a touch screen module 972, a notification module 973, etc.

The UI module 971 may provide a specialized UI, a specialized graphics user interface (GUI), etc. which are synchronized with the mobile device 1100 according to an application. The touch screen module 972 may sense a touch gesture of a user on a touch screen and may transmit information about the touch gesture to the processor 905. The touch screen module 972 according to an embodiment of the disclosure may recognize and analyze a touch code. The touch screen module 972 may be formed as an additional hardware device including a controller.

Various sensors may be provided in or around the touch screen to sense a touch gesture or an approximate-touch gesture on the touch screen. For example, the sensors for sensing the touch gesture on the touch screen may include a haptic sensor. The haptic sensor refers to a sensor configured to sense contact with a specific object at a human or higher level. The haptic sensor may sense various information, such as the roughness of a contact surface, the rigidity of a contact object, the temperature of a contact point, etc.

Also, the sensors for sensing the touch gesture on the touch screen may include a proximity sensor.

The proximity sensor refers to a sensor configured to sense an object approaching a certain sensing surface or an object existing around the certain sensing surface, by using the power of electromagnetic field or infrared rays without a mechanical contact. Examples of the proximity sensor may include a transmissive photoelectron sensor, a direct reflection-type photoelectron sensor, a mirror reflection-type photoelectron sensor, a high frequency oscillation proximity sensor, a capacitance-type proximity sensor, a magnetic proximity sensor, an infrared proximity sensor, etc. The touch gesture of the user may include a tapping gesture, a touching & holding gesture, a double-tapping gesture, a dragging gesture, a panning gesture, a flicking gesture, a dragging and dropping gesture, a swiping gesture, etc.

The notification module 973 may generate a signal for notifying about an occurrence of an event of the mobile device 1100. Examples of the event occurring in the mobile device 1100 may include call signal reception, message reception, key signal inputting, schedule notification, etc. The notification module 973 may output a video signal-type notification signal through the display 921, an audio signal-type notification signal through the sound outputter 922, and a vibration signal-type notification signal through the vibration motor 923.

Figure 11:
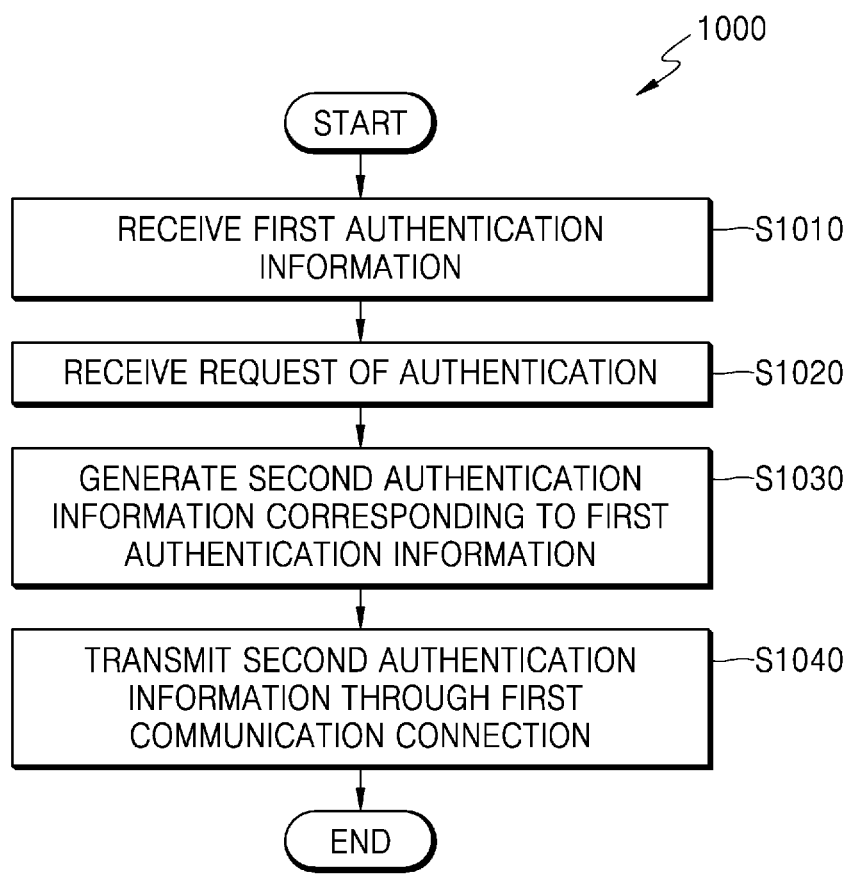
FIG. 11 is a flowchart of operations of a mobile device, according to an embodiment of the disclosure.

FIG. 11 is a flowchart of operations of a mobile device, according to an embodiment of the disclosure. In detail, FIG. 11 is the flowchart of operations performed by the mobile device 305, 900, or 1100 according to the embodiments of the disclosure described with reference to FIGS. 3 through 10, for authentication with respect to a vehicle. Also, FIG. 11 is the flowchart of a vehicle authentication method 1000, according to an embodiment of the disclosure. The vehicle authentication method 1100 may be performed by the mobile device 305, 900, or 1100. Thus, when describing the vehicle authentication method 1000 illustrated in FIG. 11, descriptions of aspects that are the same as the aspects of the mobile device 305, 900, or 1100 described with reference to FIGS. 3 through 11 will not be given. Also, as an example of the mobile device performing the vehicle authentication method 1000, the mobile device 1100 illustrated in FIG. 10 is described.

Referring to FIG. 11, according to the vehicle authentication method 1000, the first authentication information generated by a registered vehicle (in detail, the registered vehicle electronic device 300, 400, 500, or 800) may be received in operation S1010. Operation S1010 may identically correspond to operation S330 and may be performed by the communicator 930 under control of the processor 905.

In detail, the processor 905 may control the first authentication information generated from the registered vehicle electronic device 300, 400, 500, or 800 to be received from a server (not shown) through the communicator 930. In detail, the processor 905 may transmit identification information about the vehicle to the server and request the first authentication information corresponding to the identification information about the vehicle to be received, wherein the identification information about the vehicle is obtained by the processor 905 in the registration process 301. Also, the processor 905 may control the communicator 930 to directly receive the first authentication information from the vehicle electronic device 300, 400, 500, or 800 through the first communication connection in the registration process 301.

Also, the request of authentication may be received from the vehicle electronic device 300, 400, 500, or 800 through the first communication connection in operation S1020. Here, operation S1020 may identically correspond to operation S350 and may be performed by the communicator 930 under control of the processor 905.

When the request of authentication is received, the second authentication information corresponding to the first authentication information may be generated in operation S1030. Here, operation S1030 may identically correspond to operation S360 and may be performed under control of the processor 905. Here, the second authentication information may include authentication information for a single use, which is generated by the mobile device 305 based on the first authentication information. Here, the authentication information for the single use may include an OTP.

Also, according to the vehicle authentication method 1000, the second authentication information may not be directly generated in response to the request of authentication. Rather, the second authentication information may be generated only when authentication through biometric information is performed and the biometric authentication is completed. In detail, the vehicle authentication method 1000 may further include an operation of authenticating biometric information (not shown in FIG. 11) after operation S1020. The operation of authenticating the biometric information will be described in detail hereinafter with reference to operation S355 of FIG. 12.

Next, the generated second authentication information may be transmitted to the vehicle electronic device 300, 400, 500, or 800 through the first communication connection in operation S1040. Here, operation S1040 may identically correspond to operation S370 and may be performed by the communicator 930 under control of the processor 905.

Figure 12:
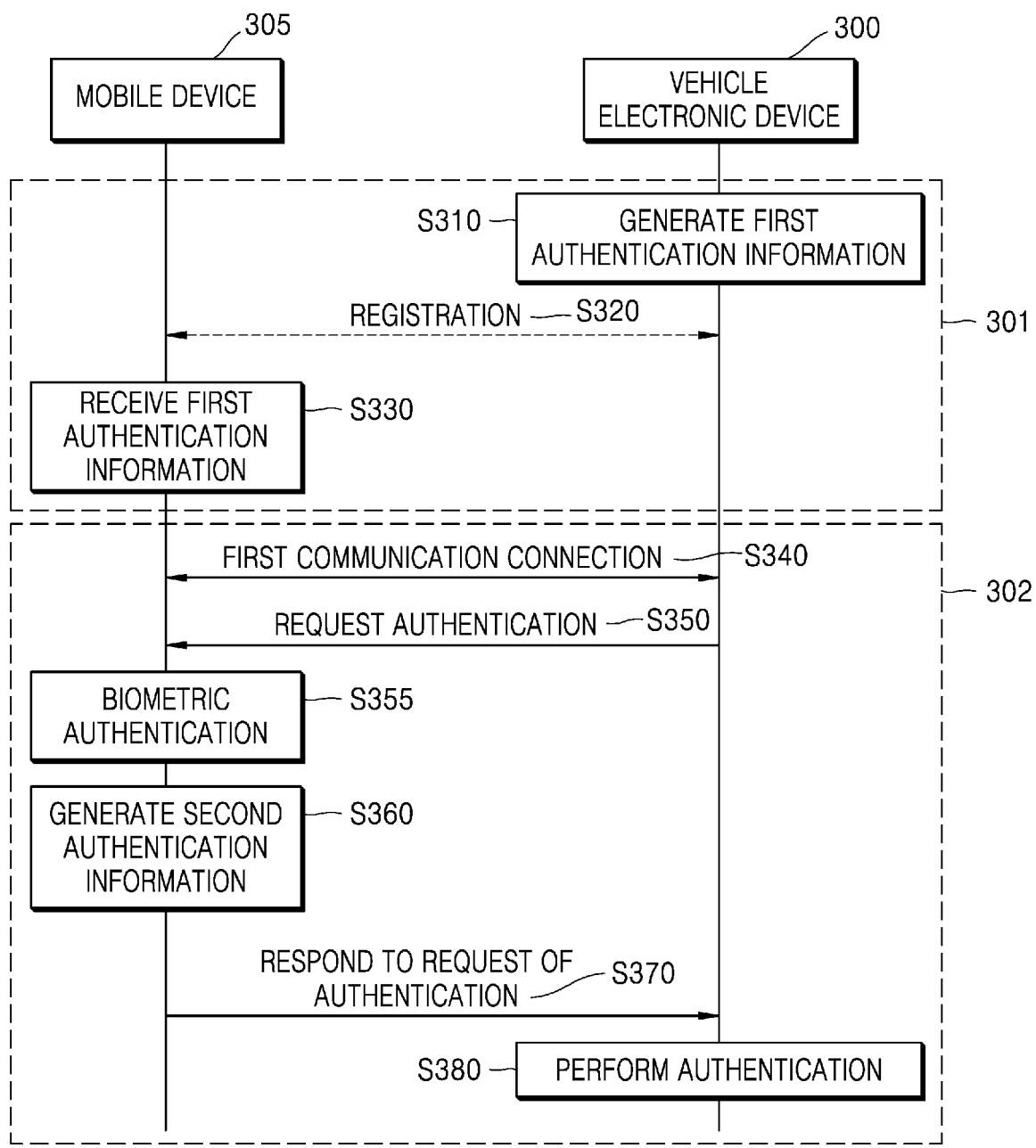
FIG. 12 is a diagram for describing a mobile device and a vehicle electronic device for performing authentication with respect to a vehicle, according to another embodiment of the disclosure.

FIG. 12 is a diagram for describing a mobile device and a vehicle electronic device for performing authentication with respect to a vehicle, according to another embodiment of the disclosure. Operations illustrated in FIG. 12 that are the same as the operations illustrated in FIG. 3 are illustrated by using the same reference numerals.

Referring to FIG. 12, in addition to the operations illustrated in FIG. 3, the mobile device 305 may further perform the operation of authenticating the biometric information (S355). Also, the mobile device 305 performing operation S355 may include the mobile device 900 or 1100 described with reference to FIGS. 9 through 11.

Referring to FIGS. 10 and 12, when the request of authentication is received (S350), the mobile device 1100 may perform the operation of generating the second authentication information (S360), only when biometric information of a legitimate user of the mobile device 1100, that is, a registered user of the mobile device 1100, is sensed and identified through the biometric sensor 991.

Figure 16:
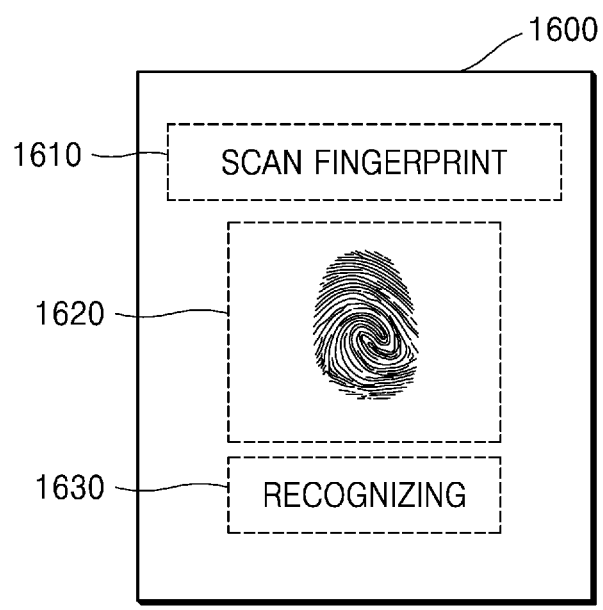
FIG. 16 is a view of a user interface screen for biometric information authentication, the user interface screen being output on a mobile device, according to an embodiment of the disclosure.

FIG. 16 is a view of a user interface screen 1600 for biometric information authentication, the user interface screen being output on the mobile device 1100, according to an embodiment of the disclosure.

When the request of authentication is received in operation S350, the mobile device 1100 may output the user interface screen 1600 requesting for biometric authentication. Referring to FIG. 16, the mobile device 1100 may output the user interface screen 1600 guiding for the registered user to input biometric information. For example, the user interface screen 1600 may include a guide message 1610, prompting the user to provide the biometric information at the biometric sensor. For example, where the biometric sensor is a fingerprint sensor disposed under the display, the user interface face screen 1600 may include an indicator 1620 indicating the location of the fingerprint sensor. Also, the user interface screen 1600 may further include at least one of a sign 1620 indicating biometric information to be recognized or a state message 1630 indicating the recognition of the biometric information. The state message 1630 may indicate whether or not recognition or sensing with respect to the biometric information is properly performed. For example, the state message 1630 may include, the wordings "recognizing," "fingerprint is being recognized," "do not lift the finger," etc., while the biometric information is being recognized. Also, when the recognition of the biometric information fails, the state message 1630 may include, for example, the wordings "recognition has failed," "please re-try fingerprint recognition," "re-scanning is required," etc. Also, when the recognition of the biometric information is completed, the state message 1630 may include the wordings "recognition completed," "fingerprint recognition has succeeded," etc.

When the recognized biometric information matches with the biometric information of the registered user, based on a result of the biometric authentication performed in operation S355, the processor 905 of the mobile device 1100 may control the operation of generating the second authentication information (S360) to be performed.

Hereinafter, the registration process 301 illustrated in FIGS. 3 through 12 will be described in detail with reference to FIGS. 13 through 20. According to an embodiment of the disclosure, the mobile device performing the registration process 301 may include the mobile device 305, 900, or 1100 described above. Also, the vehicle electronic device performing the registration process 301 may include the vehicle electronic device 300, 400, 500, or 800 described above. In FIGS. 13 through 20, an example in which the mobile device performing the registration process 301 is the mobile device 1100 illustrated in FIG. 10, and the vehicle electronic device performing the registration process 301 is the vehicle electronic device 500 illustrated in FIG. 5 will be described. Also, in describing operations for performing the registration process 301 described with reference to FIGS. 13 through 20, descriptions of aspects that are the same as the aspects of the operations included in the registration process 301 described in FIGS. 3 through 12 will not be repetitively given. Also, in FIGS. 13 through 20, the same configurations are illustrated by using the same reference numerals.

FIG. 13 is a diagram for describing an operation of registering a mobile device in a vehicle, according to an embodiment of the disclosure.

Referring to FIG. 13, operations S1310, S1320, S1330, and S1340 may be included in the registration operation (S320) illustrated in FIGS. 3 and 12.

According to an embodiment of the disclosure, the processor 410 of the vehicle electronic device 500 may control the display 420 to display a first screen including coded vehicle identification information 1301. Here, the coded vehicle identification information 1301 may include information that is visually recognizable and may include information formed in a QR code, a bar code, a PIN code, etc.

Figure 14:
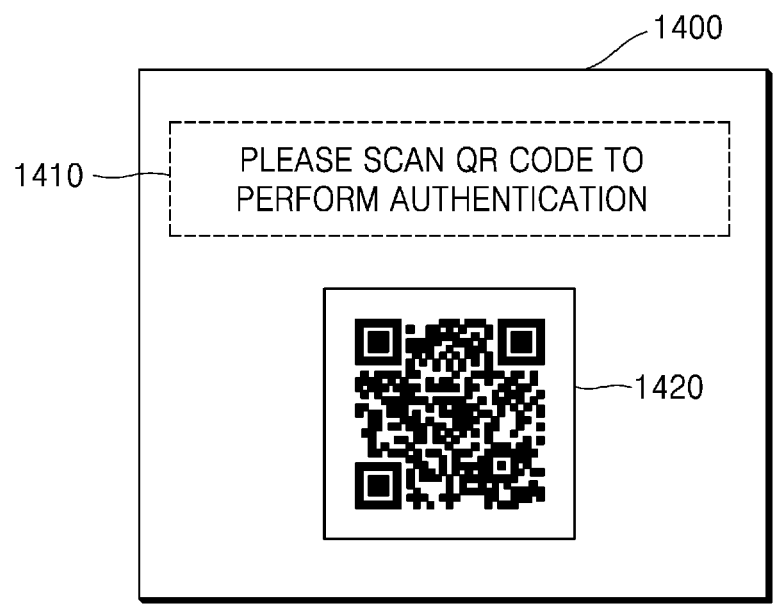
FIG. 14 is a view of a user interface screen that is output on a vehicle electronic device, according to an embodiment of the disclosure.

FIG. 14 is a view of a user interface screen 1400 that is output on the vehicle electronic device 500, according to an embodiment of the disclosure.

Referring to FIG. 14, the vehicle electronic device 500 may display the user interface screen 1400 including a QR code 1420. Also, the user interface screen 1400 may further include a guide message 1410 requesting a user of the mobile device 1100 to scan a first screen.

In detail, the coded vehicle identification information 1301 may include information required to generate the first communication connection, specifically, a D2D communication connection. For example, it will be assumed that the first communication connection is set according to the BLE standards. In this case, to successfully set the BLE communication connection, first, information for an access to a network, such as a network address (for example, a BLE address) required for an electronic device (for example, a mobile device) to access the other device (for example, a vehicle electronic device) through BLE pairing, may be required. Accordingly, the coded vehicle identification information 1301 may include a network access address with respect to the vehicle electronic device 500, the network access address being required for the mobile device 900 to access a communication network connecting the vehicle electronic device 500, and information for specifying a vehicle or a vehicle electronic device.

The mobile device 900 may identify the first screen that is output on the vehicle electronic device 500 in operation S1310. In detail, the mobile device 900 may visually recognize the coded vehicle identification information 1301 through the camera 961 in operation S1310.

The mobile device 900 may perform setting of the first communication connection based on the first screen identified in operation S1310, in operation S1320. In detail, the processor 905 of the mobile device 900 may obtain the network access address with respect to the vehicle electronic device 500 from the recognized coded vehicle identification information 1301 and may execute the first communication connection with the vehicle electronic device 500 by using the obtained network access address, in operation S1320.

Figure 15:
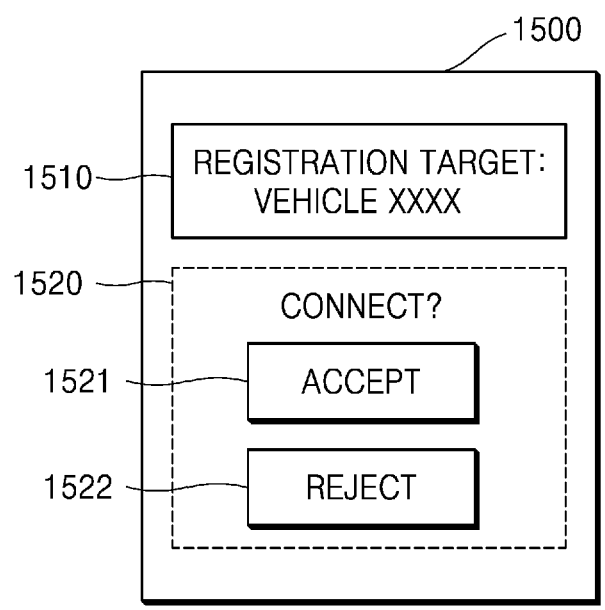
FIG. 15 is a view of a user interface screen that is output on a mobile device, according to an embodiment of the disclosure.

FIG. 15 is a view of a user interface screen 1500 that is output on the mobile device 1100, according to an embodiment of the disclosure.

The mobile device 1100 may display the user interface screen 1500. The user interface screen 1500 identifies the vehicle electronic device 300 (or the vehicle) and asks the user whether to register the mobile device 1100 with the vehicle electronic device 300, and vice versa.

Also, the user interface screen 1500 may further include a menu 1520 for requesting the first communication connection. The menu may requests confirmation from the user as to whether to form a D2D communication channel with the recognized vehicle (or vehicle electronic device). The processor 905 may execute the first communication connection only when the user of the mobile device 1100 requests the first communication connection (for example, only when an input of touching an acceptance button 1521 is received). Also, when the user of the mobile device 1100 rejects the first communication connection (for example, when an input of touching a rejection button 1522 is input), the mobile device 1100 may not perform a registration operation of devices (S1330) and end the process.

Also, when the first communication connection is executed in operation S1320, a D2D communication channel, through which the mobile device 900 and the vehicle electronic device 500 may perform D2D communication, may be formed. Then, the device registration between the mobile device 900 and the vehicle electronic device 500 may be performed through the D2D communication channel in operation S1330. In detail, the mobile device 900 may receive a request of registration from the vehicle electronic device 500 and may perform device registration in response to the request of registration, through the D2D communication channel formed in operation S1320. The device registration may denote the process in which the mobile device 1100 safely receives the first authentication information generated in the vehicle electronic device 500.

In detail, the device registration between the mobile device 900 and the vehicle electronic device 500 may be performed through a pairing process according to a certain communication standard. For example, an example in which the first communication connection includes a BLE communication connection will be described.

The device registration between the mobile device 900 and the vehicle electronic device 500 may be performed by executing BLE pairing according to the BLE standards.

In detail, the BLE pairing may mainly include three operations, in the first of which, a request of pairing and a response thereto may be performed. In detail, the mobile device 1100 may transmit a signal for requesting the pairing to the vehicle electronic device 500, and the vehicle electronic device 500 may transmit a response of permitting the pairing to the mobile device 1100 in response to the request of the pairing. The second operation of the BLE pairing may include generating a secure channel to maintain the security. In detail, in the second operation, a short term key (STK) may be generated between the two devices, which are the mobile device 1100 and the vehicle electronic device 500, to generate a secure channel that is to be temporarily used. In the sequential third operation, secure keys to be used for the BLE pairing may be shared. In detail, after executing the BLE pairing, an identity resolving key (IRK), which is used to convert a random address, transmitted by the mobile device 1100, into a BLE address, which is the original address transmitted during the BLE pairing, may be exchanged. In detail, when keys for the BLE pairing, such as a long-term key (LTK), the IRK, and a connection signature resolving key (CSRK), are shared, the BLE pairing may be completed. Here, the information transmitted during the BLE pairing, for example, the BLE address, the keys, such as the LTK, the IRK, and the CSRK, and the like may be stored in the processor 905 or the memory 970 of the mobile device 1100. Also, the information transmitted for the BLE pairing may be shared with and stored in the vehicle electronic device 500.

In the above example, a case in which operation S1330 is performed through the device registration through the BLE pairing, is described. However, the disclosure is not limited thereto, and operation S1330 may be performed according to different communication standards used for the first communication connection.

When the device registration is completed in operation S1330, the mobile device 1100 may become the registered mobile device, and the vehicle electronic device 500 may transmit the first authentication information to the mobile device 1100 through a communication channel generated through the first communication connection formed in operation S1320. Accordingly, the mobile device 1100 may receive and store the first authentication information in operation S1360.

Also, when the first authentication information is received, the mobile device 1100 may perform an operation of authenticating biometric information (S1350). The operation of authenticating the biometric information (S1350) is the same as the operation of authenticating the biometric information (S355) described in FIG. 12. Also, the first authentication information may be stored only when the authentication with respect to the biometric information succeeds.

That is, when the authentication with respect to the biometric information fails, the mobile device 1100 may not store the first authentication information, and thus, the registration between the mobile device 1100 and the vehicle electronic device 500 may fail.

Also, the mobile device 1100 may store the received first authentication information in the secure area 990.

Figure 17:
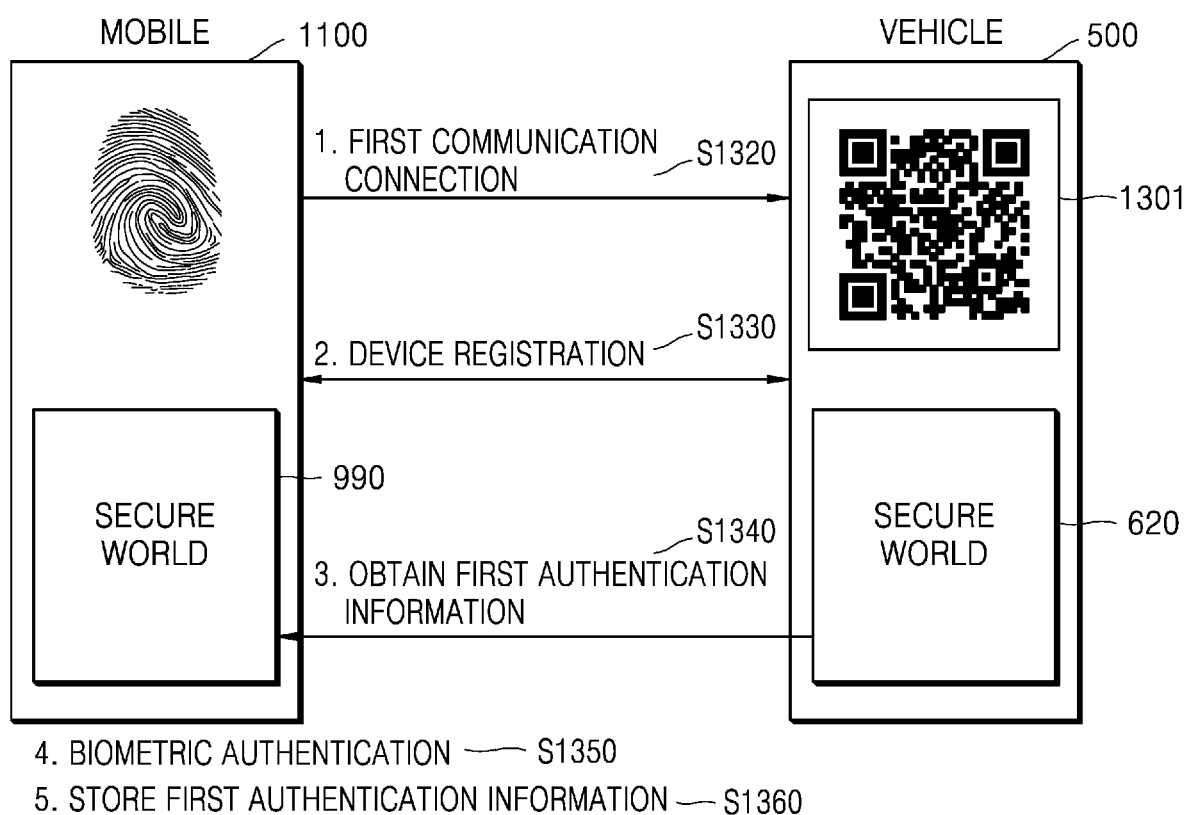
FIG. 17 is a diagram for describing an operation of registering a mobile device in a vehicle, according to another embodiment of the disclosure.

FIG. 17 is a diagram for describing an operation of registering a mobile device in a vehicle, according to another embodiment of the disclosure. FIG. 17 is another view for describing the registration process 301 of FIGS. 3 and 12. In FIG. 17, the same components as FIG. 16 are illustrated by using the same reference numerals. Thus, in describing the registration process illustrated in FIG. 17, descriptions of aspects that are the same as the aspects in FIG. 16 will not be given.

Compared to the registration process illustrated in FIG. 16, in the registration process illustrated in FIG. 17, the vehicle electronic device 500 may not display the coded vehicle identification information 1301, and the mobile device 900 may directly execute the first communication connection in operation S1720. Also, the mobile device 900 may perform registration with respect to the vehicle electronic device 500 searched for as a target of the first communication connection, through the first communication connection (S1330), in operation S1720.

In detail, referring to FIG. 17, the mobile device 900 may search for a communication network through which a D2D communication channel may be established with respect to the vehicle electronic device 500, via the short-range wireless communicator 951. In detail, the D2D communication channel may include communication channels according to the standards, such as Bluetooth, Wi-Fi, BLE, NFC/RFID, Wi-Fi direct, UWB, Zigbee, and the like.

In detail, the user of the mobile device 900, who is to perform authentication with respect to the vehicle through the mobile device 900, may manipulate the mobile device 900 to connect a network for establishing a D2D communication channel with respect to the vehicle electronic device 500.

Figure 18:
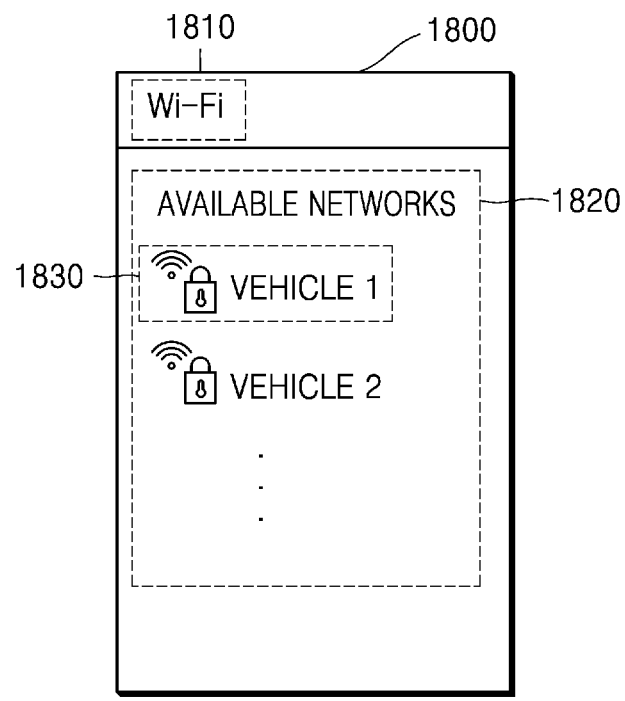
FIG. 18 is a view of a user interface screen that is output on a mobile device, according to another embodiment of the disclosure.

FIG. 18 is a view of a user interface screen 1800 that is output on the mobile device 900, according to another embodiment of the disclosure.

When the D2D communication channel is formed according to the Wi-Fi communication standards, the processor 905 of the mobile device 900 may activate a function of a Wi-Fi module of the communicator 930 and search for the other device which is available for communication according to the Wi-Fi standards. Then, according to a search result, the mobile device 900 may display the user interface screen 1800.

Referring to FIG. 18, the user interface screen 1800 may include information 1810 about a type of a network of the first communication connection and information 1820 about a network, which is a target of the first communication connection (or a vehicle electronic device or a vehicle, which is a target device of the first communication connection). FIG. 18 illustrates an example in which a Wi-Fi network is used as the network for the first communication connection.

When the user of the mobile device 900 requires the first communication connection with vehicle 1 (or a vehicle electronic device included vehicle 1), the user may select a network corresponding to vehicle 1 through the user interface screen 1800. Also, when the network corresponding to vehicle 1 is selected, the processor 905 may request an input of a network access password required for a D2D communication connection with respect to vehicle 1, and when the network access password is properly input, the execution of the first communication connection (S1720) may be successfully completed. Here, the network access password may include a password that is set in the vehicle electronic device 500 for the first communication connection.

Figure 19:
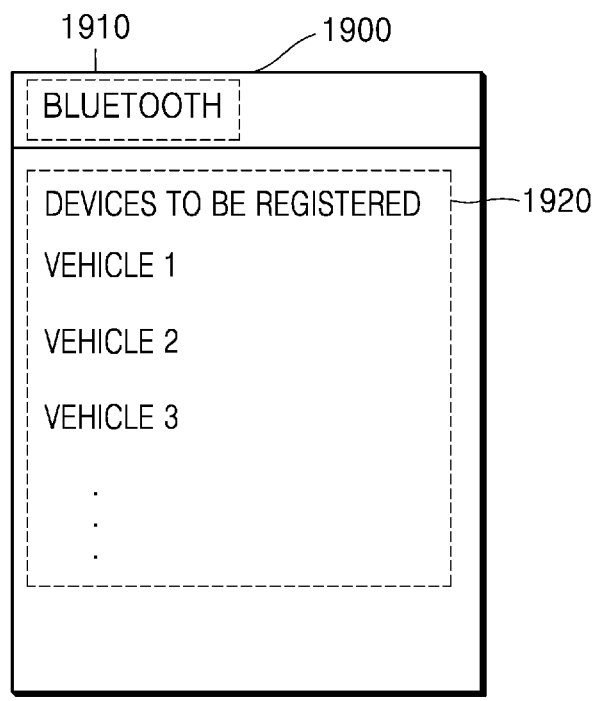
FIG. 19 is a view of a user interface screen that is output on a mobile device, according to another embodiment of the disclosure.

FIG. 19 is a view of a user interface screen 1900 that is output on the mobile device 1100, according to another embodiment of the disclosure. FIG. 19 illustrates an example in which a Bluetooth network is used as the network for the first communication network.

Referring to FIG. 19, the user interface screen 1900 may include information 1910 about a type of a network of the first communication connection and information 1920 about a network, which is a target of the first communication connection (or a vehicle electronic device or a vehicle, which is a target device of the first communication connection). Similarly to the description with reference to FIG. 18, when a user of the mobile device 1100 requires the first communication connection with vehicle 1 (or a vehicle electronic device included in vehicle 1), the user may select a network corresponding to vehicle 1 through the user interface screen 1900. Also, when the network corresponding to vehicle 1 is selected, the processor 905 may request the vehicle electronic device 500 to accept a D2D communication connection with respect to vehicle 1. In response to the request, when the vehicle electronic device 500 accepts the D2D communication connection, the mobile device 1100 may successfully complete the execution of the first communication connection (S1720).

Figure 20:
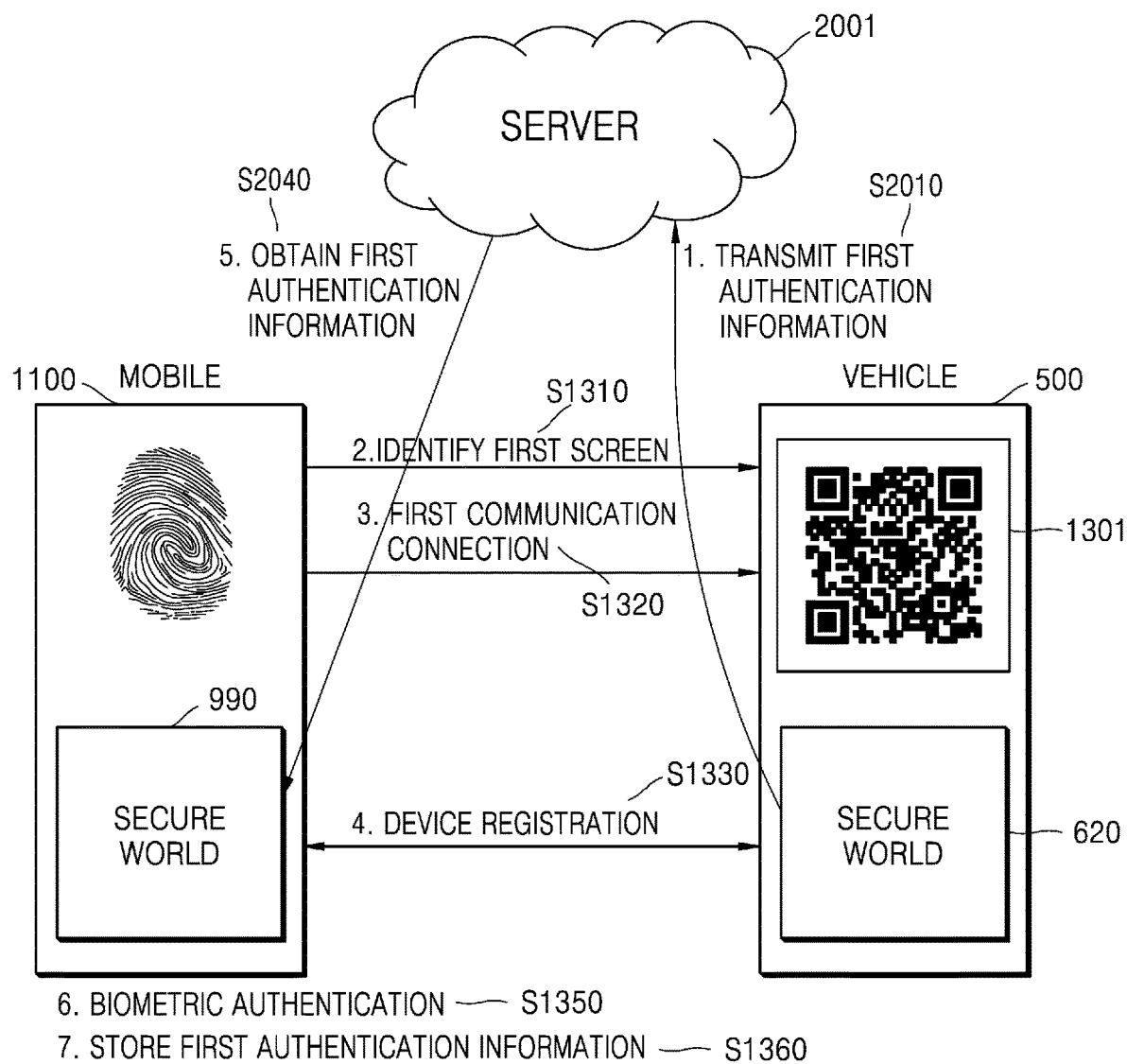
FIG. 20 is a diagram for describing an operation of registering a mobile device in a vehicle, according to another embodiment of the disclosure.

FIG. 20 is a diagram for describing an operation of registering a mobile device in a vehicle, according to another embodiment of the disclosure.

According to an embodiment of the disclosure, in the registration process 301, the transmission of the first authentication information may be performed by a server 2001.

Referring to FIG. 20, the vehicle electronic device 500 may generate the first authentication information and transmit the generated first authentication information to the server 2001 in operation S2010. Operation S2010 may be performed by the transceiver 430 under control of the processor 410.

The server 2001 may include a cloud server used for authentication with respect to a vehicle. The server 2001 may include a server for supporting an authentication service through the mobile device 1100 or a server for supporting services of the vehicle electronic device 500 or services of the vehicle, in which the vehicle electronic device 500 is mounted.

The server 2001 may receive the first authentication information and may store information about the vehicle generating the first authentication information, information about the vehicle electronic device, or information about a network connected to the vehicle electronic device (in detail, network access information with respect to the vehicle electronic device) by matching the information with the first authentication information.

The mobile device 1100 may sequentially perform the operations included in operations S1310, S1320, and S1330, to obtain the network access information for a communication connection with the vehicle electronic device 500. Here, the network access information may include information required to complete the communication connection with the vehicle electronic device 500 and may include network access information with respect to the vehicle electronic device 500 and information for identification of the vehicle or the vehicle electronic device 500. Alternatively, the coded identification information 1301 recognized in operation S1310 may include the information for identification of the vehicle or the vehicle electronic device, for example, vehicle ID information, etc.

The mobile device 1100 may request the server 2001 to transmit the first authentication information generated by the registered vehicle electronic device 500, by using the coded identification information 1310 recognized in operation S1310 and the network access information obtained in operation S1330. In detail, the mobile device 1100 may obtain the identification information about the vehicle electronic device through at least one of the coded identification information 1301 or the network access information and may transmit the obtained identification information about the vehicle electronic device to the server 2001. Then, the server 2001 may transmit the first authentication information corresponding to the identification information of the vehicle electronic device, the identification information being transmitted from the mobile device 1100, to the mobile device 1100, in response to the request of the mobile device 1100.

When the server is a main agent for performing authentication, the server needs to directly generate information for the authentication and transmit the information to each of the mobile device and the vehicle electronic device, and thus, the amount of data for a server connection and the calculation load of the server may be increased. However, according to an embodiment of the disclosure, the server 2001 may only transmit the first authentication information to the mobile device 305, wherein the first authentication information is directly generated by the vehicle electronic device 500. Also, when authentication is performed at a time point after the first authentication information is obtained by the mobile device 305, the authentication may be performed without the transmission performed by the server 2001. Thus, the server does not need to directly perform authentication by newly generating information for authentication whenever the authentication is to be performed. Also, the server does not need to transmit the information for the authentication to the mobile device and the vehicle electronic device whenever the authentication is to be performed. Thus, according to an embodiment of the disclosure, the amount of calculations of the server used for authentication and the amount of data use for the server connection may be minimized.

Figure 21:
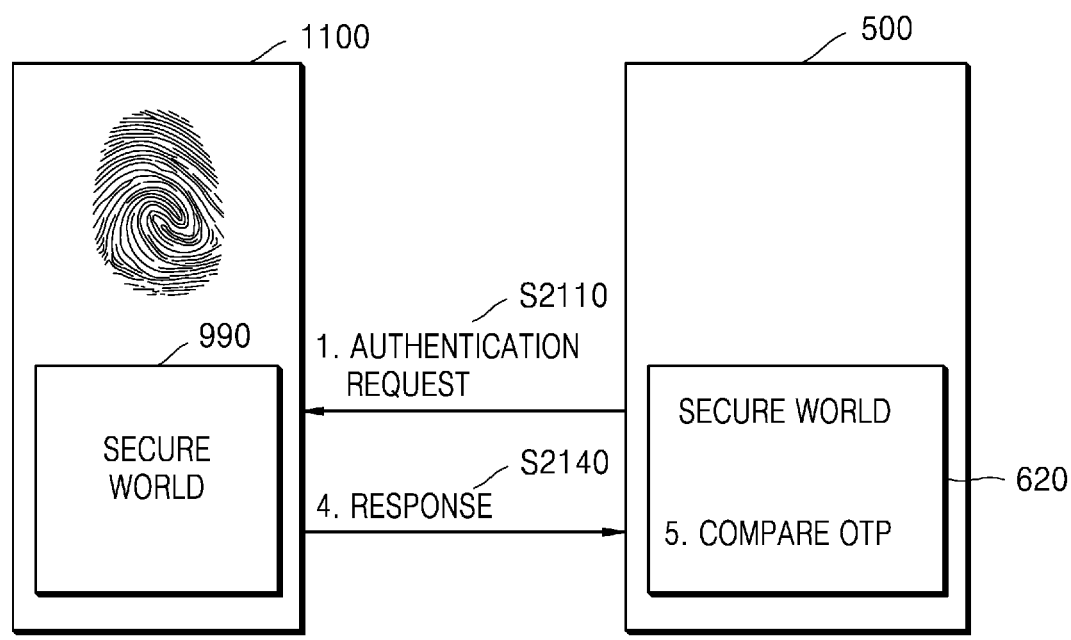
FIG. 21 is a diagram for describing operations for performing authentication with respect to a vehicle, according to an embodiment of the disclosure.

FIG. 21 is a diagram for describing operations performed for authentication with respect to a vehicle, according to an embodiment of the disclosure. FIG. 21 is the view for describing, in detail, the authentication process 302 illustrated in FIGS. 3 and 12.

According to an embodiment of the disclosure, the mobile device performing the authentication process 302 may include the mobile device 305, 900, or 1100. Also, the vehicle electronic device performing the authentication process 302 may include the vehicle electronic device 300, 400, 500, or 800 described above. In FIG. 21, an example in which the mobile device performing the authentication process 302 is the mobile device 1100 illustrated in FIG. 10, and the vehicle electronic device performing the authentication process 302 is the vehicle electronic device 500 illustrated in FIG. 5 will be described.

Operations S2110, S2120, S2130, and S2140 illustrated in FIG. 21 may identically correspond to operations S350, S355, S360, and S370 illustrated in FIG. 12, respectively.

Referring to FIG. 21, the vehicle electronic device 500 may request authentication through the mobile device 1100 through the first communication connection in operation S2110. Then, in response to the request of the authentication, the mobile device 1100 may perform biometric authentication with respect to a user of the mobile device 1100 in operation S2120, as described above with reference to FIG. 16, and when the biometric authentication succeeds, the mobile device 1100 may generate the second authentication information (in detail, an OTP) in operation S2130. Also, in response to the request of the authentication, the mobile device 1100 may transmit the second authentication information to the vehicle electronic device 500.

The vehicle electronic device 500 may perform the authentication based on a result of comparing the received second authentication information with the first authentication information.

Figure 22:
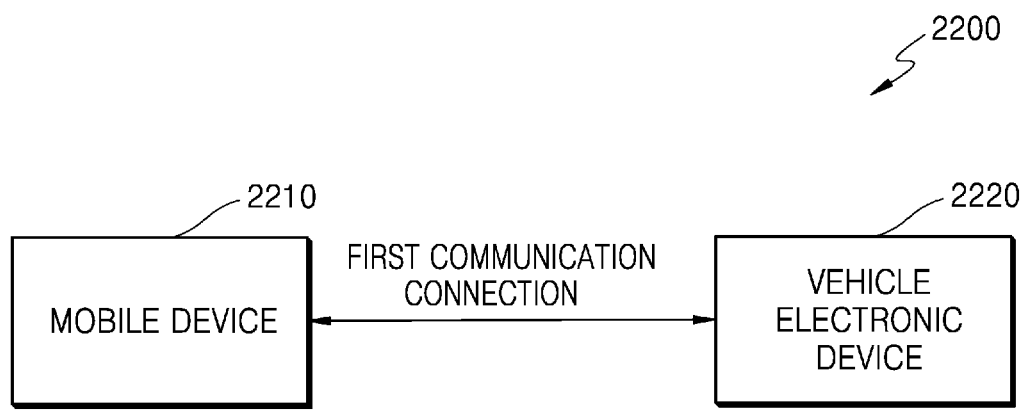
FIG. 22 is a diagram of an authentication system according to an embodiment of the disclosure.

FIG. 22 is a diagram of an authentication system according to an embodiment of the disclosure.

Referring to FIG. 22, the authentication system according to an embodiment of the disclosure may include a mobile device 2210 and a vehicle electronic device 2220. The mobile device 2210 and the vehicle electronic device 2220 may directly communicate with each other through the first communication connection and may perform authentication. In detail, the mobile device 2210 and the vehicle electronic device 2220 may perform the authentication with respect to a vehicle, by performing the registration process 301 described in detail with reference to FIGS. 13 through 19 and the authentication process 302 described in detail with reference to FIGS. 1 through 21.

In detail, the mobile device 2210 may receive and store the first authentication information generated by the registered vehicle electronic device 2220 in the vehicle, and when a request of authentication is received through the first communication connection for directly communicating with the vehicle electronic device 2220, the mobile device 2210 may generate the second authentication information corresponding to the first authentication information and transmit the second authentication information to the vehicle electronic device 2220 through the first communication connection.

In detail, the vehicle electronic device 2220 may control the first authentication information to be generated and transmitted to the mobile device 2210, may request the authentication through the mobile device 2210 through the first communication connection, and may perform the authentication based on whether or not the second authentication information transmitted from the mobile device 2210 in response to the request of the authentication corresponds to the first authentication information. Here, the vehicle electronic device 2220 may control a communicator (an example of a communicator included in the vehicle electronic device 2220, which is not shown in FIG. 22 and may correspond to the communicator 930 illustrated in FIG. 9) to directly transmit the first authentication information to the mobile device 2210 or to transmit the first authentication information to the mobile device 2210 through a transmission device (for example, a server (not shown)).

The mobile device 2210 and the vehicle electronic device 2220 may respectively identically correspond to the mobile device 305, 900, or 1100 and the vehicle electronic device 300, 400, 500, or 800 described in FIGS. 1 through 21, and thus, detailed descriptions about the mobile device 2210 and the vehicle electronic device 2220 will not be given.

Figure 23:
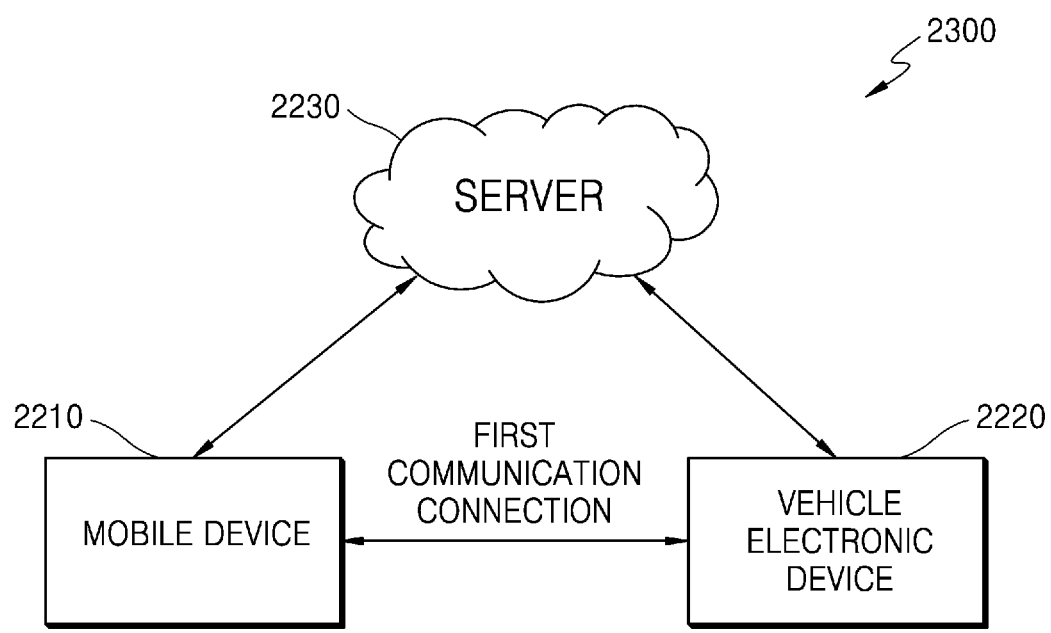
FIG. 23 is a diagram of an authentication system according to another embodiment of the disclosure.

FIG. 23 is a diagram of an authentication system according to another embodiment of the disclosure.

Referring to FIG. 23, the authentication system according to an embodiment of the disclosure may include the mobile device 2210, the vehicle electronic device 2220, and a server 2230. In detail, the mobile device 2210 and the vehicle electronic device 2220 may perform authentication with respect to a vehicle, by performing the registration process 301 described in detail with reference to FIG. 20 and the authentication process 302 described in detail with reference to FIGS. 1 through 21.

Referring to FIG. 23, the server 2230 may communicate with the vehicle electronic device 2220 and the mobile device 2210 according to a long distance communication standard. In detail, the vehicle electronic device 2220 may control the first authentication information to be transmitted to the server 2230, and the mobile device 2210 may receive the first authentication information from the server 2230.

The mobile device 2210, the vehicle electronic device 2220, and the server 2230 may respectively identically correspond to the mobile device 305, 900, or 1100, the vehicle electronic device 300, 400, 500, or 800, and the server 2001 described in FIGS. 1 through 21, and thus, detailed descriptions about the mobile device 2210, the vehicle electronic device 2220, and the server 2230 will not be given.

Figure 24:
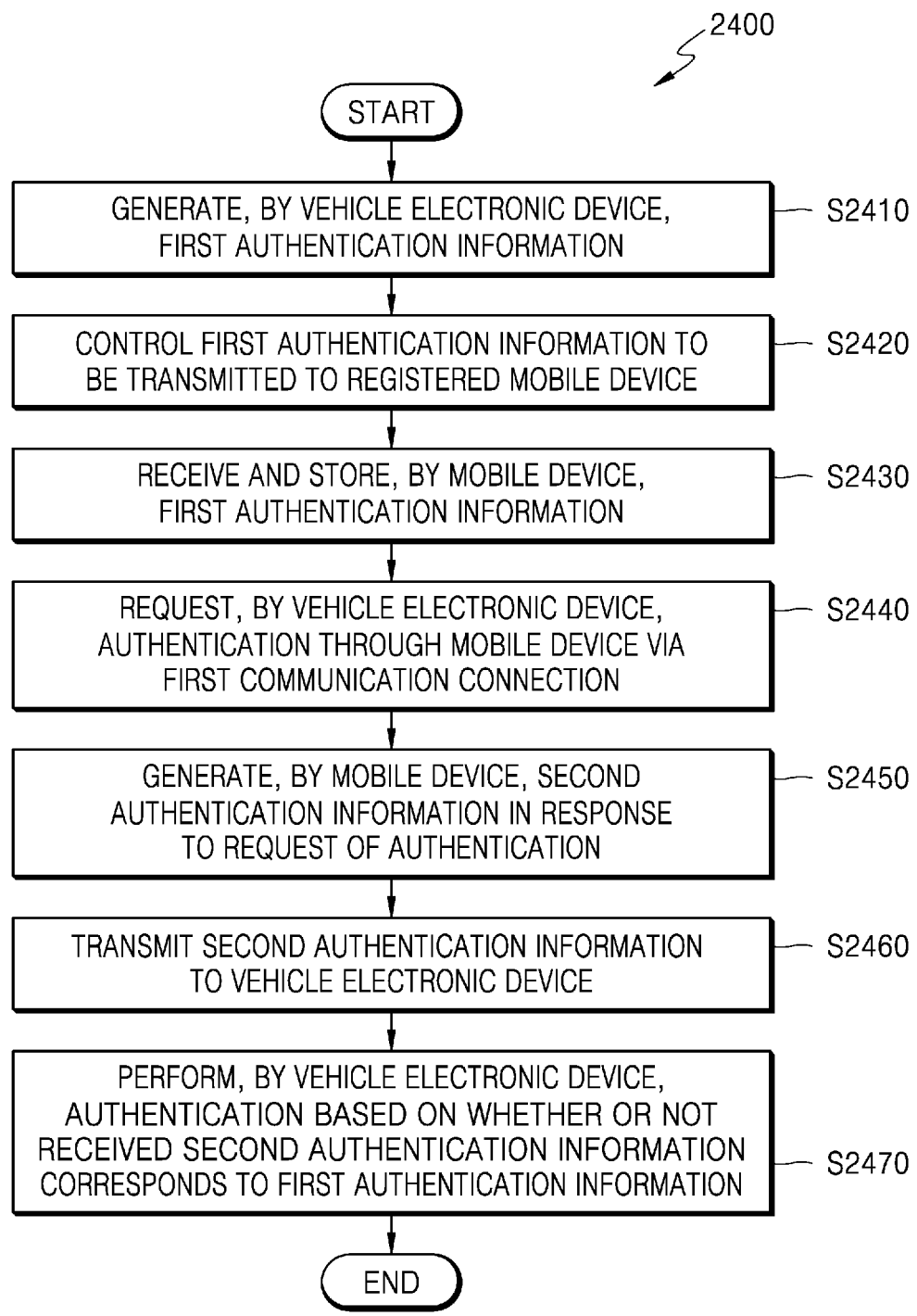
FIG. 24 is a flowchart of a vehicle authentication method according to an embodiment of the disclosure.

FIG. 24 is a flowchart of a vehicle authentication method 2400 according to an embodiment of the disclosure.

The vehicle authentication method 2400 may correspond to the authentication operations described in FIG. 3. Also, the vehicle authentication method 2400 may be performed by the mobile device 305, 900, or 1100, the vehicle electronic device 300, 400, 500, or 800, and the server 2001 described with reference to FIGS. 3 through 21. Thus, in describing the vehicle authentication method 2400, aspects that are the same as the aspects of FIGS. 3 through 23 will not be repetitively described.

In FIG. 24, an example in which the vehicle authentication method 2400 is performed by the mobile device 305 and the vehicle electronic device 300 illustrated in FIG. 3 will be described.

According to the vehicle authentication method 2400, the first authentication information may be generated by the vehicle electronic device 300 in operation S2410. Operation S2410 may identically correspond to operation S310 illustrated in FIGS. 3 and 12.

In the vehicle electronic device 300, the first authentication information may be controlled to be transmitted to the mobile device 305 in operation S2420. Then, the mobile device 305 may receive and store the first authentication information in operation S2430. Operations S2420 and S2430 may respectively identically correspond to operations S320 and S330 illustrated in FIGS. 3 and 12.

The vehicle electronic device 300 may request authentication through the mobile device 305 through the first communication connection for direct communication between the mobile device 305 and the vehicle electronic device 500, in operation S2440. Operation S2440 may identically correspond to operation S350 illustrated in FIGS. 3 and 12.

The mobile device 305 may generate the second authentication information based on the first authentication information in response to the request of the authentication in operation S2450. Operation S2450 may identically correspond to operation S360 illustrated in FIGS. 3 and 12.

Also, the second authentication information may be transmitted to the vehicle electronic device 300 in operation S2460. Operation S2460 may identically correspond to operation S370 illustrated in FIGS. 3 and 12.

The vehicle electronic device 300 may perform the authentication based on whether or not the received second authentication information corresponds to the first authentication information in operation S2470. Operation S2470 may identically correspond to operation S380 illustrated in FIGS. 3 and 12.

The vehicle authentication method according to an embodiment of the disclosure may be realized in the form of a program command which may be executed by various computing devices and may be recorded on a computer-readable medium. Also, one or more embodiments of the disclosure may include a computer-readable recording medium having recorded thereon one or more programs including instructions for executing the vehicle authentication method described above.

The computer-readable recording medium may include program commands, data files, data structures, or a combination thereof. The program commands recorded on the computer-readable recording medium may be specially designed and constructed for the disclosure or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

According to the one or more of the embodiments of the disclosure, the vehicle authentication method may be realized as a computer program product including a recording medium having recorded thereon a program for executing operations of: obtaining a sentence constructed of multiple languages; obtaining vector values respectively corresponding to words included in the sentence constructed of the multiple languages by using a multiple language translation model; converting the obtained vector values into vector values corresponding to a target language; and obtaining a sentence constructed of the target language based on the converted vector values.

The one or more of the embodiments of the disclosure provide the vehicle electronic device for performing vehicle authentication, the mobile device used for vehicle authentication, the vehicle authentication system, and the vehicle authentication method, which are configured to perform authentication with respect to a vehicle without adding an additional hardware device.

Also, the one or more of the embodiments of the disclosure provide the vehicle electronic device for performing vehicle authentication, the mobile device used for vehicle authentication, the vehicle authentication system, and the vehicle authentication method, which are configured to rapidly perform authentication by using a communication connection for directly connecting devices, even when the Internet connection environment is not established. In detail, according to the one or more of the embodiments of the disclosure, authentication may be performed without a need to access a server through a long distance communication connection, such as the Internet, whenever authentication is to be performed.

While the disclosure has been particularly shown and described with reference to example embodiments of the disclosure, it will be understood by one of ordinary skill in the art that various changes in form and details may be made therein without departing from the spirit and scope of the disclosure as defined by the following claims.

What is claimed is:

1. A vehicle electronic device comprising:
a transceiver configured to communicate with a mobile device;
an ultra wide band (UWB) sensor; and
at least one processor configured to generate first authentication information, control the transceiver to transmit the first authentication information to a registered mobile device, control the transceiver to send a request for authentication to the mobile device via a first communication connection, and perform authentication based on whether or not the at least one processor receives second authentication information from the mobile device that corresponds to the first authentication information,
wherein the first communication connection directly communicates with the mobile device,
wherein the vehicle electronic device receives the second authentication information from the mobile device in response to authentication of biometric information of a user at the mobile device, and
wherein the at least one processor is further configured to identify whether or not a user is present in a vehicle based on a sensing operation of the UWB sensor, and when the user is present in the vehicle, control the authentication to be performed.

2. The vehicle electronic device of claim 1, wherein the second authentication information includes authentication information for a single use.

3. The vehicle electronic device of claim 1, further comprising a display; and wherein the at least one processor is further configured to:
control the display to display a first screen including coded vehicle identification information, wherein the coded vehicle identification information comprises a network access address and
directly receive the second authentication information from the mobile device through the first communication connection, wherein the first communication connection uses the network access address.

4. The vehicle electronic device of claim 1, wherein the first authentication information includes at least one of identification information about the vehicle or identification information about the user requesting the authentication.

5. The vehicle electronic device of claim 1, wherein the at least one processor is further configured to control the first authentication information to be transmitted to a server through a communication connection according to a long distance communication standard.

6. The vehicle electronic device of claim 1, wherein the at least one processor is further configured to
set the registered mobile device by registering a mobile device with which the first communication connection is completed and
directly transmit the first authentication information to the registered mobile device through the first communication connection.

7. The vehicle electronic device of claim 1, further comprising a memory including a secure area,
wherein the at least one processor is further configured to control the first authentication information to be stored in the secure area.

8. The vehicle electronic device of claim 1, wherein the first authentication information includes identification information about a user, and
the at least one processor is further configured to
authenticate whether or not the user corresponds to a user of the registered mobile device based on whether or not the second authentication information corresponds to the first authentication information and,
when the authentication is completed, perform an environment setting operation corresponding to the user of the registered mobile device.

9. The vehicle electronic device of claim 1, wherein the at least one processor is further configured to generate the first authentication information by updating the first authentication information every first cycle and, when the updating of the first authentication information is completed, control the updated first authentication information to be transmitted to the registered mobile device.

10. A system for performing authentication with respect to a vehicle, the system including a mobile device and a vehicle electronic device located in the vehicle,
wherein the mobile device is configured to receive and store first authentication information generated by a registered vehicle electronic device, in response to a request of authentication being received from the vehicle electronic device through a first communication connection directly communicating with the vehicle electronic device, generate second authentication information corresponding to the first authentication information, and transmit the second authentication information to the vehicle electronic device through the first communication connection, and
the vehicle electronic device is configured to generate the first authentication information, control the first authentication information to be transmitted to a registered mobile device, send a request for authentication to the mobile device via the first communication connection, and perform the authentication based on whether or not the vehicle electronic device receives the second authentication information transmitted from the mobile device that corresponds to the first authentication information; and
wherein the vehicle electronic device receives the second authentication information from the mobile device, in response to authentication of a user's biometric information at the mobile device, and
wherein the vehicle electronic device is further configured to identify whether or not a user is present in the vehicle based on a sensing operation of a UWB sensor, and when the user is present in the vehicle, control the authentication to be performed.

11. The system of claim 10, further comprising a server configured to communicate with the vehicle electronic device and the mobile device according to a long distance communication standard, wherein the vehicle electronic device is further configured to control the first authentication information to be transmitted to the server, and
the mobile device is further configured to control the first authentication information to be received from the server.

12. A vehicle electronic device comprising:
a transceiver configured to communicate with a mobile device;
a display;
an ultra wide band (UWB) sensor; and
at least one processor configured to:
generate first authentication information,
control the display to display a first screen including coded information comprising a network access information required to generate a first communication connection between the vehicle electronic device and the mobile device, wherein the first communication connection being performed by recognizing the coded information by the mobile device,
control the transceiver to transmit the first authentication information to the mobile device via the first communication connection,
control the transceiver to send a request for authentication to the mobile device via the first communication connection and receive second authentication information corresponding to the first authentication information via the first communication connection, and
when the at least one processor identifies that a user is present in vehicle based on a sensing operation of the UWB sensor, perform authentication based on the second authentication information,
wherein the first communication connection directly communicates with the mobile device.

* * * * *